(12) United States Patent
Uchiyama

(10) Patent No.: US 10,637,620 B2
(45) Date of Patent: Apr. 28, 2020

(54) COMMUNICATION DEVICE, BASE STATION AND COMMUNICATION METHOD

(71) Applicant: SONY CORPORATION, Tokyo (JP)

(72) Inventor: Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 76 days.

(21) Appl. No.: 15/766,530

(22) PCT Filed: Jan. 12, 2017

(86) PCT No.: PCT/JP2017/000842
§ 371 (c)(1),
(2) Date: Apr. 6, 2018

(87) PCT Pub. No.: WO2017/135002
PCT Pub. Date: Aug. 10, 2017

(65) Prior Publication Data
US 2018/0294935 A1    Oct. 11, 2018

(30) Foreign Application Priority Data

Feb. 4, 2016 (JP) .................. 2016-020159

(51) Int. Cl.
| | |
|---|---|
| *H04W 4/00* | (2018.01) |
| *H04L 5/00* | (2006.01) |
| *H04W 72/04* | (2009.01) |
| *H04L 27/26* | (2006.01) |
| *H04W 4/40* | (2018.01) |
| *H04L 25/02* | (2006.01) |

(52) U.S. Cl.
CPC .......... *H04L 5/0048* (2013.01); *H04L 5/0058* (2013.01); *H04L 25/0202* (2013.01); *H04L 27/261* (2013.01); *H04L 27/2613* (2013.01); *H04W 4/40* (2018.02); *H04W 72/0406* (2013.01)

(58) Field of Classification Search
None
See application file for complete search history.

(56) References Cited

U.S. PATENT DOCUMENTS

| | | |
|---|---|---|
| 2013/0114756 A1 | 5/2013 | Jia et al. |
| 2014/0269357 A1 | 9/2014 | Dhakal et al. |

(Continued)

FOREIGN PATENT DOCUMENTS

| | | |
|---|---|---|
| EP | 2 779 512 A2 | 9/2014 |
| JP | 2011-77647 A | 4/2011 |

(Continued)

OTHER PUBLICATIONS

Sony, "Discussion on potential DMRS enhancement for V2X", 3GPP TSG RAN WG1 Meeting #83, R1-156710, Nov. 15-22, 2015, 3 pages.

(Continued)

*Primary Examiner* — Phirin Sam
(74) *Attorney, Agent, or Firm* — Xsensus LLP

(57) ABSTRACT

There is provided an electronic device including circuitry configured to control vehicle-to-X (V2X) communication based on an arrangement format of reference signals for channel estimation used for the V2X communication, and dynamically set the arrangement format for the reference signals.

19 Claims, 23 Drawing Sheets

(56) References Cited

U.S. PATENT DOCUMENTS

| | | | |
|---|---|---|---|
| 2015/0149059 A1* | 5/2015 | Choi | B60W 30/146 |
| | | | 701/96 |
| 2017/0024621 A1* | 1/2017 | Thompson | H04W 4/46 |
| 2018/0227155 A1* | 8/2018 | Khoryaev | H04L 27/2602 |
| 2018/0242190 A1* | 8/2018 | Khoryaev | H04W 28/0284 |
| 2018/0359067 A1* | 12/2018 | Kim | H04L 5/0051 |
| 2019/0045526 A1* | 2/2019 | Lee | H04L 1/00 |

FOREIGN PATENT DOCUMENTS

| | | |
|---|---|---|
| JP | 2015-185959 A | 10/2015 |
| WO | 2014/155198 A2 | 10/2014 |
| WO | 2017/026477 A1 | 2/2017 |

OTHER PUBLICATIONS

ZTE, "Discussion on DMRS Enhancement for PC5-based V2V", 3GPP TSG-RAN WG1 Meeting #83, R1-156660, Nov. 15-22, 2015, 5 pages.

International Search Report dated Apr. 4, 2017 in PCT/JP2017/000842 filed Jan. 12, 2017.

Ericsson, Proposed Correction to 36.213: PSSCH Reception Timing, 3GPP TSG RAN WG1 Meeting #80, Athens, Greece, Feb. 2015, R1-150654, 2 pages.

Japanese Office Action dated Aug. 20, 2019, issued in corresponding Japanese Patent Application No. 2016-020159.

* cited by examiner

[Fig. 1]
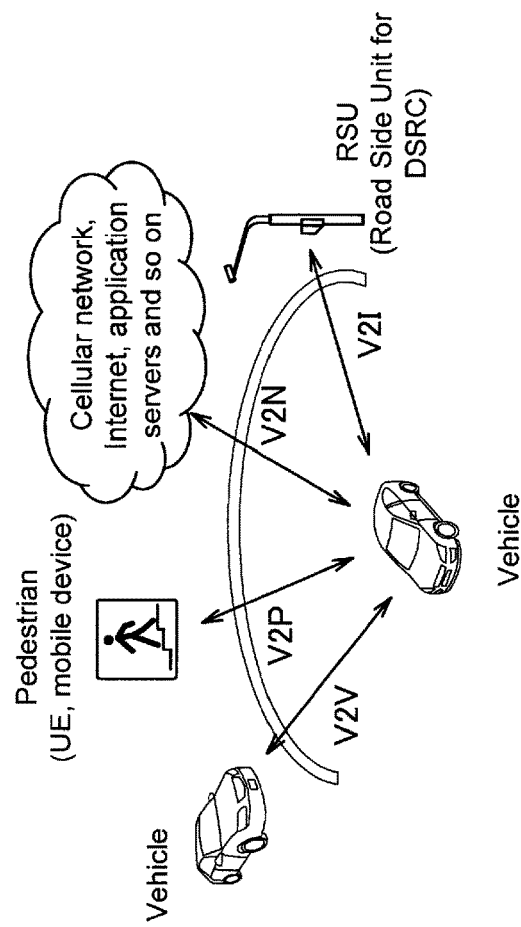
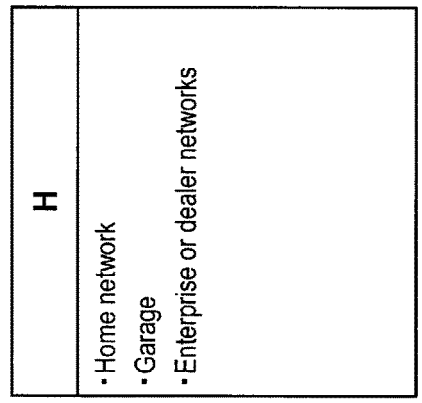
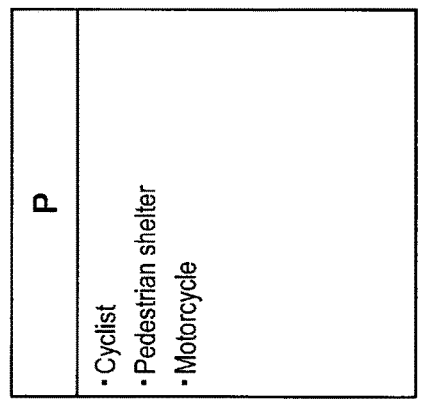
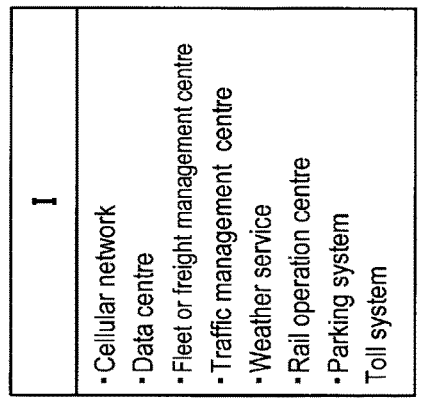
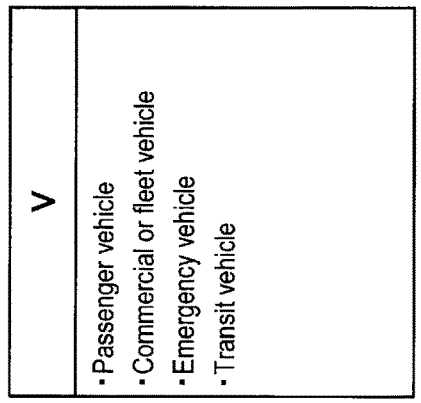

[Fig. 2]
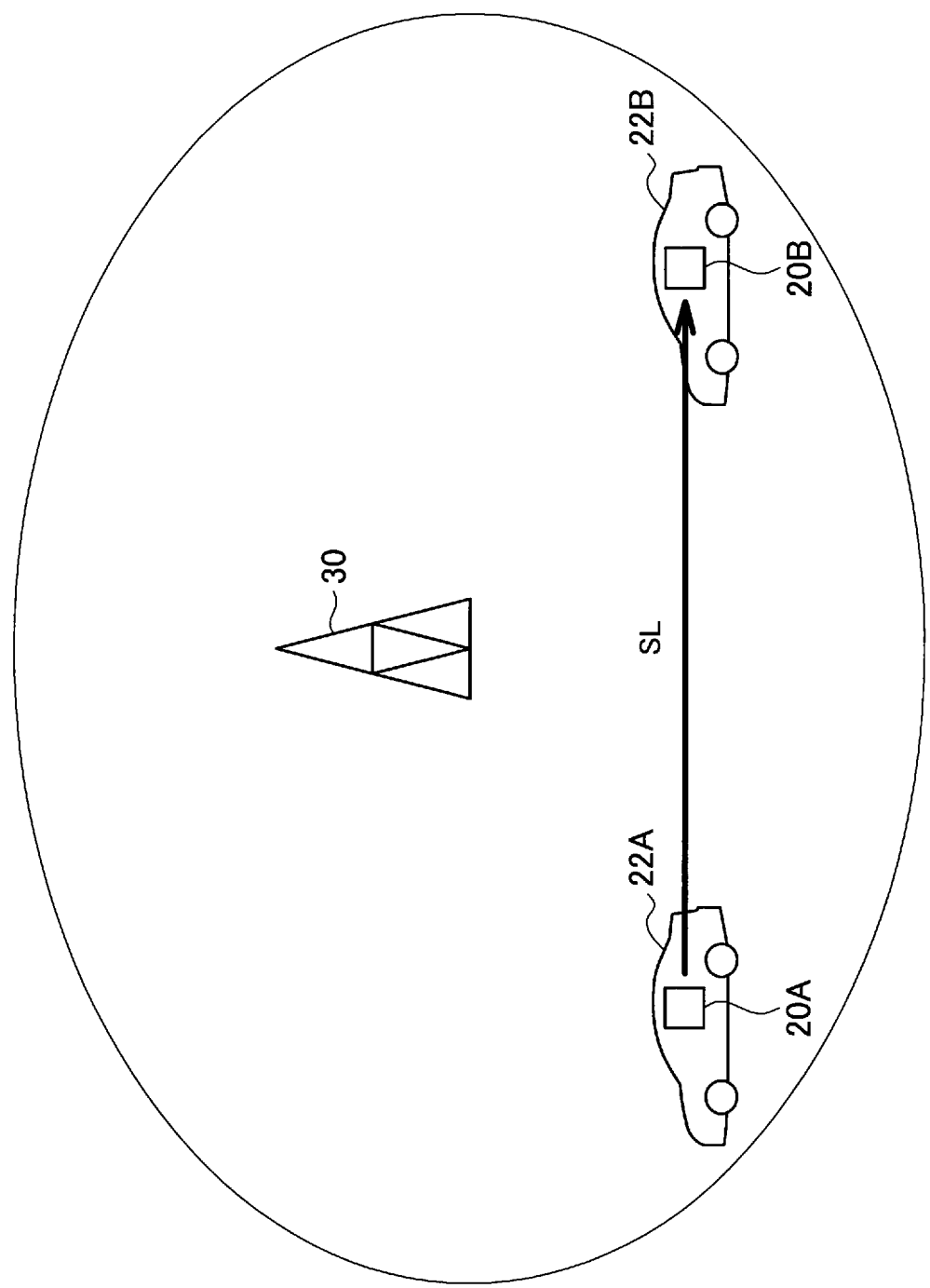

[Fig. 3]
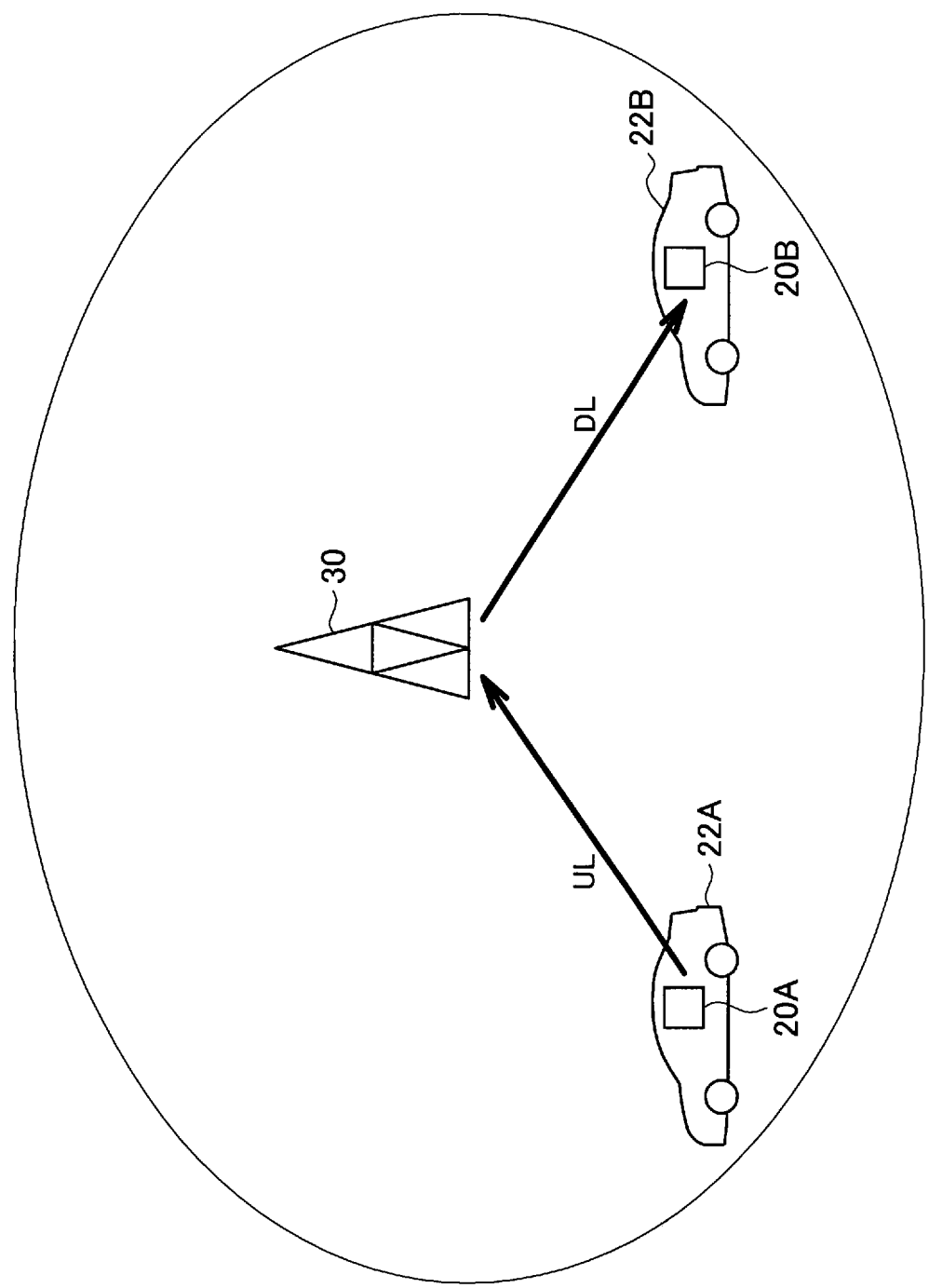

[Fig. 4]
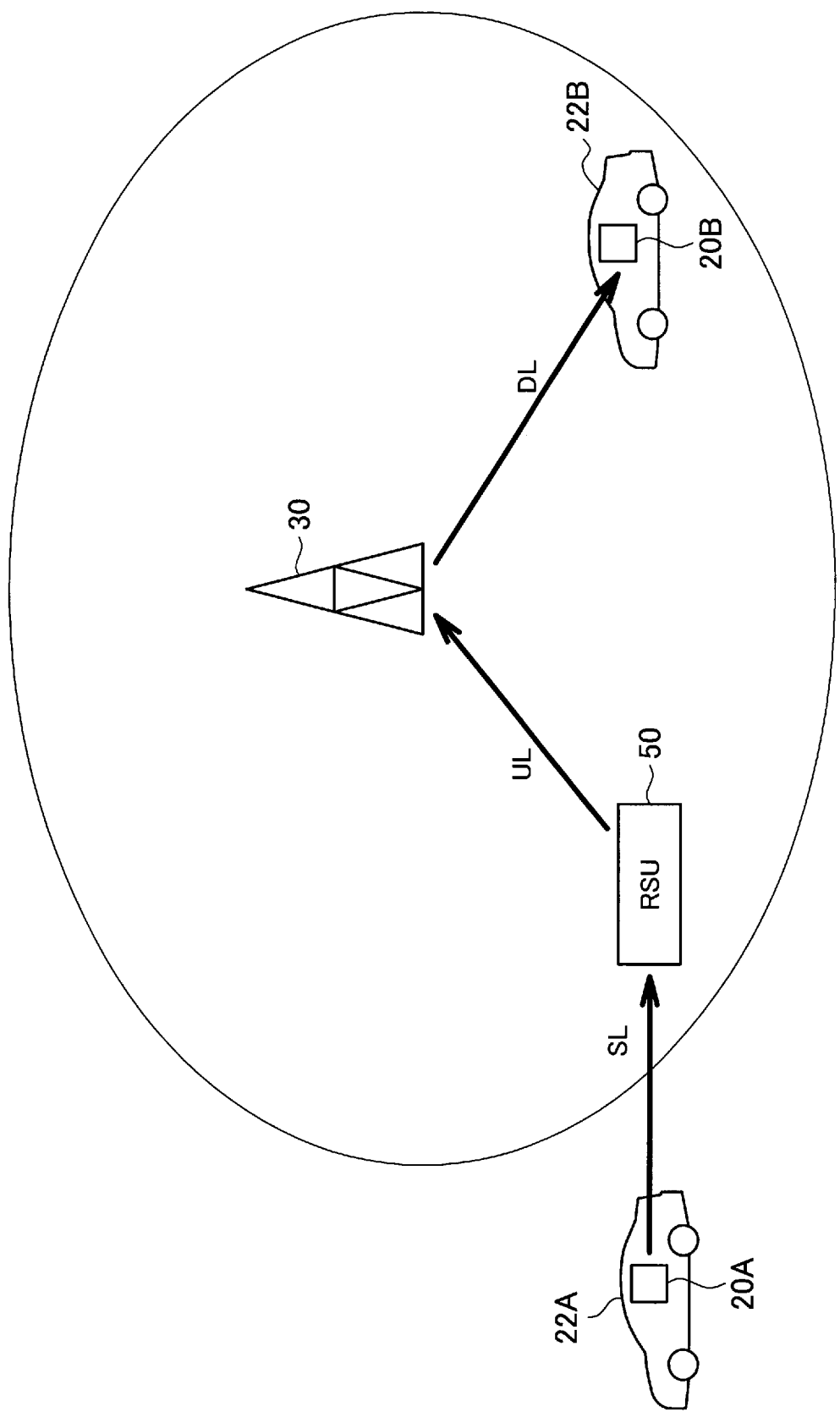

[Fig. 5]
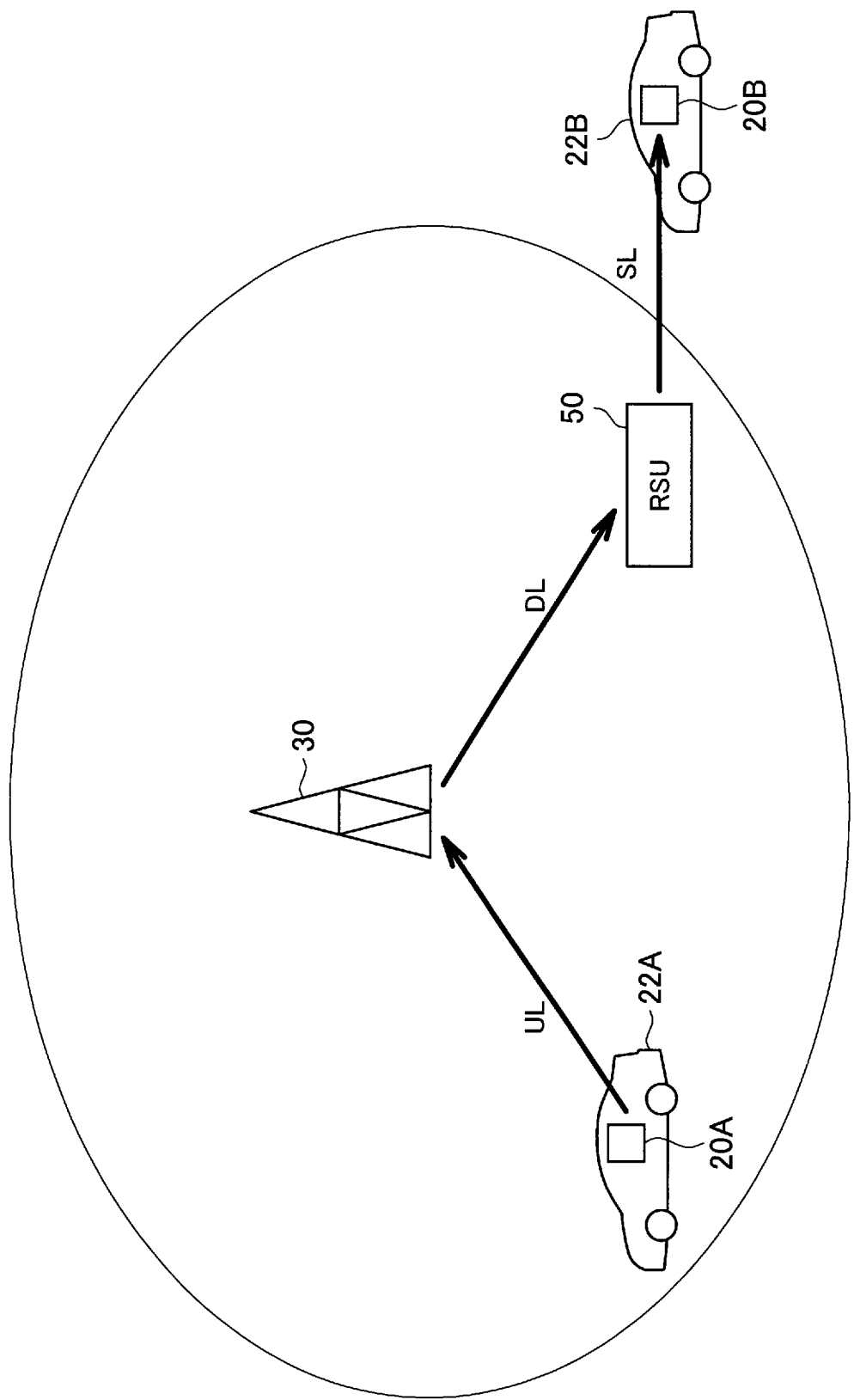

[Fig. 6]
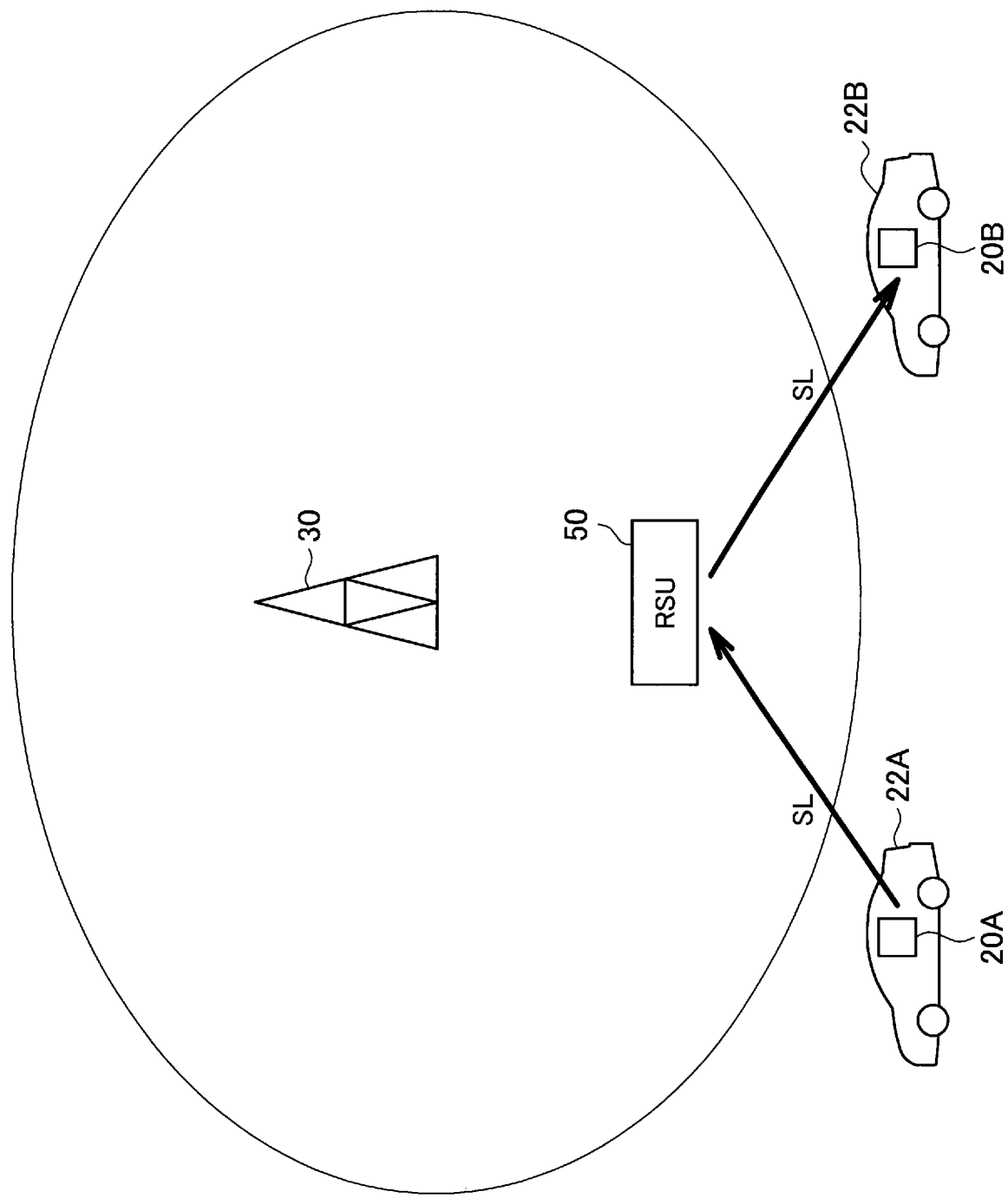

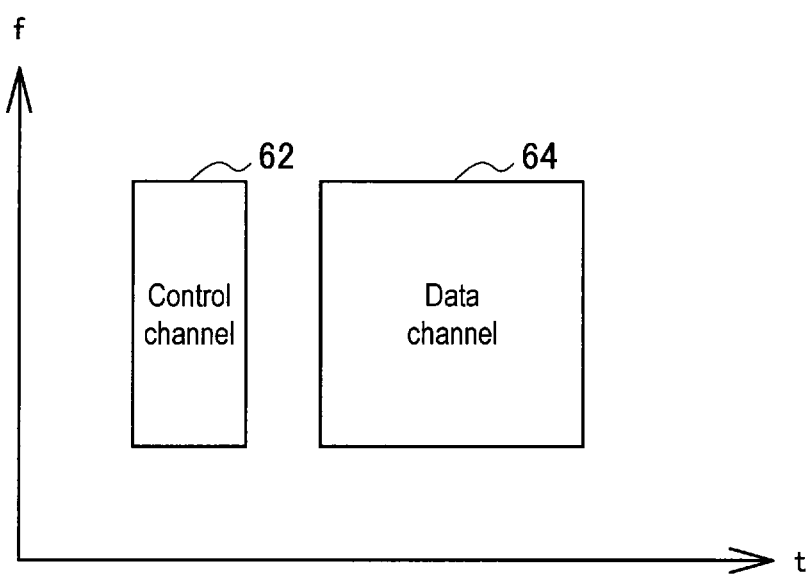
[Fig. 7]

[Fig. 8]
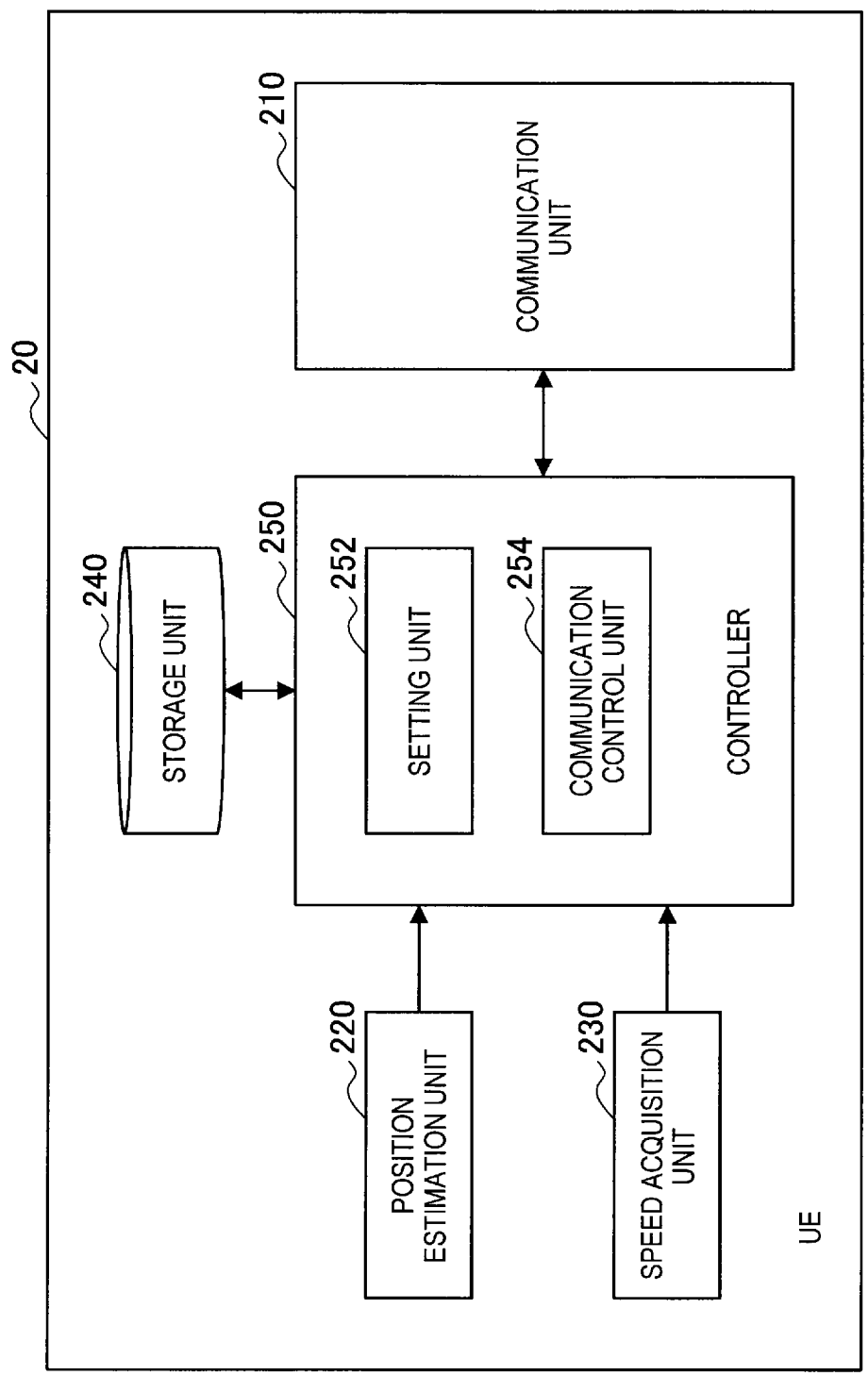

[Fig. 9]

| | ALLOCATION TYPE | APPLICATION CONDITION | CHANNEL TYPE | FREQUENCY | FORMAT |
|---|---|---|---|---|---|
| E0 | persistent | All | CONTROL CHANNEL | FREQUENCY A | FORMAT 1 |
| | persistent | All | DATA CHANNEL | FREQUENCY A | FORMAT 1 |
| | persistent | All | CONTROL CHANNEL | FREQUENCY B | FORMAT 2 |
| | persistent | All | DATA CHANNEL | FREQUENCY B | FORMAT 2 |
| E1 | semi-persistent | AREA A | CONTROL CHANNEL | FREQUENCY A | FORMAT 1 |
| E2 | semi-persistent | AREA A | DATA CHANNEL | FREQUENCY A | FORMAT 2 |
| E3 | semi-persistent | AREA A | CONTROL CHANNEL | FREQUENCY B | FORMAT 2 |
| | semi-persistent | AREA A | DATA CHANNEL | FREQUENCY B | FORMAT 3 |
| | ... | ... | ... | ... | ... |
| E4 | dynamic | 20km/h OR LOWER | CONTROL CHANNEL | FREQUENCY A | FORMAT 1 |
| | dynamic | 20km/h OR LOWER | DATA CHANNEL | FREQUENCY A | FORMAT 1 |
| | dynamic | 20km/h OR LOWER | CONTROL CHANNEL | FREQUENCY B | FORMAT 2 |
| | dynamic | 20km/h OR LOWER | DATA CHANNEL | FREQUENCY B | FORMAT 2 |

[Fig. 10]
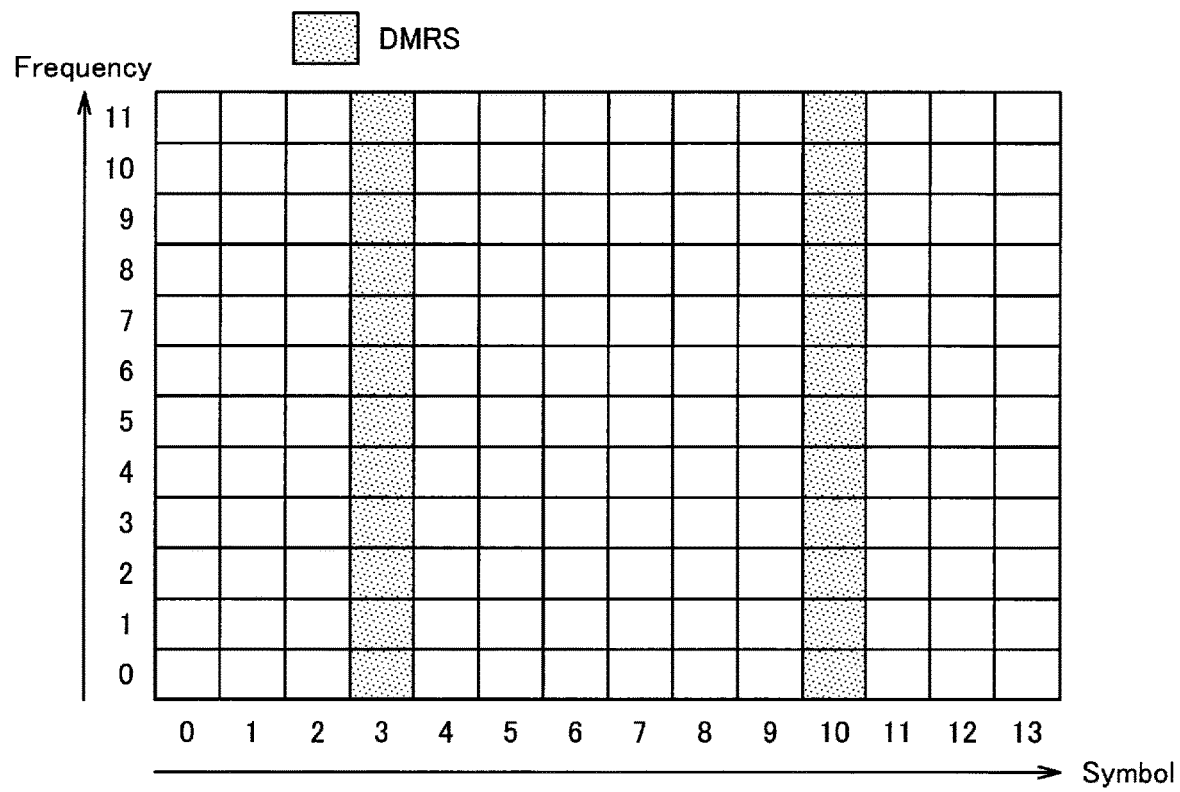
[Fig. 11]
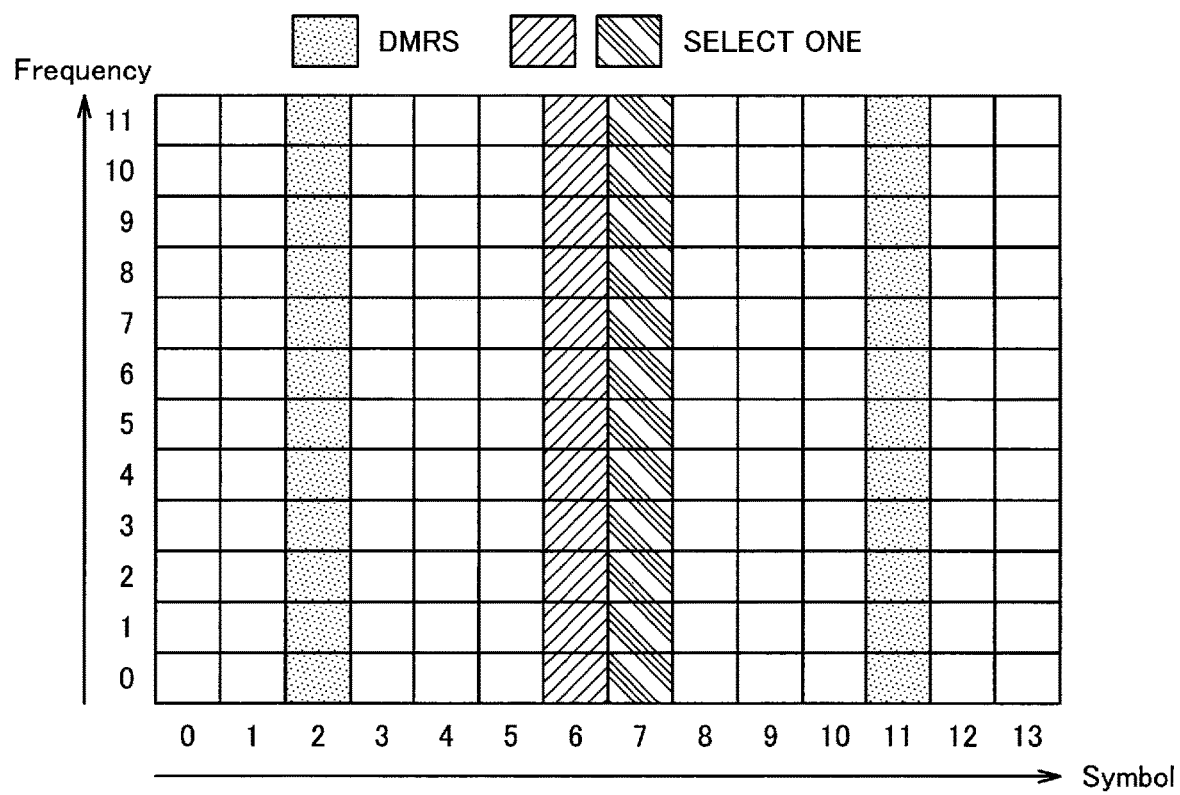

[Fig. 12]
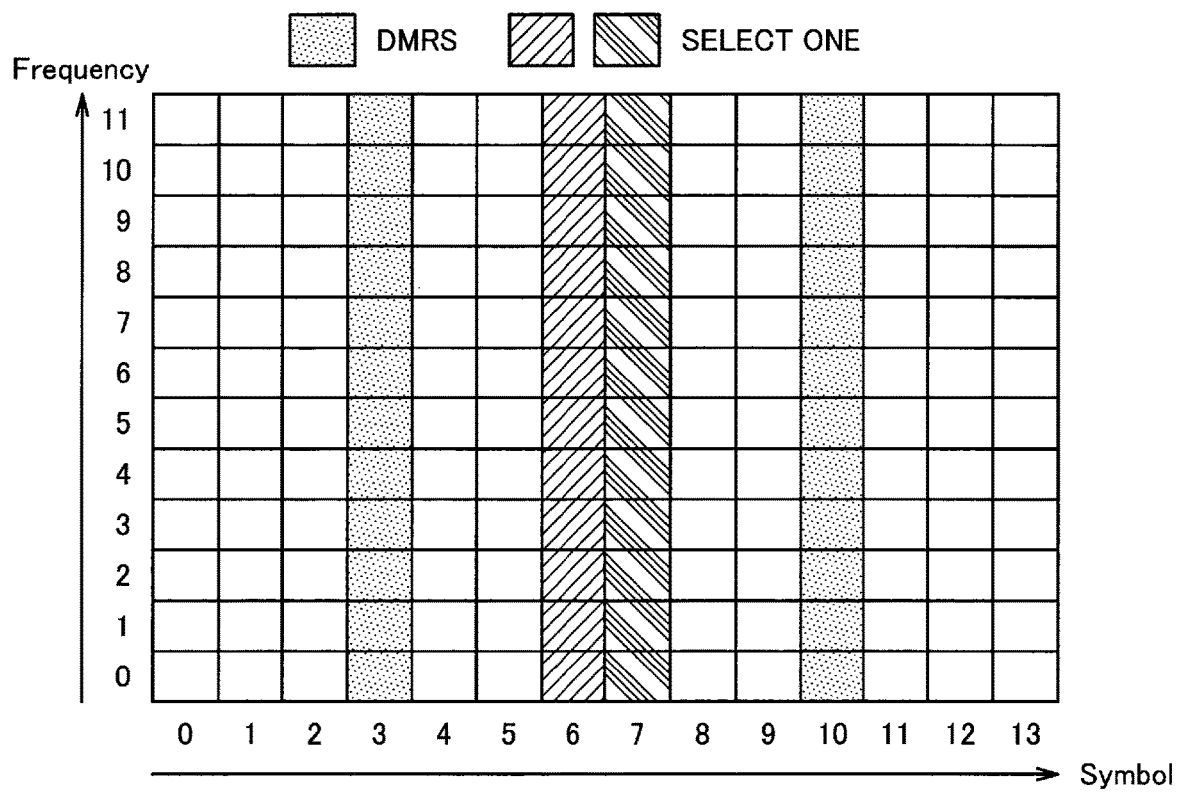
[Fig. 13]
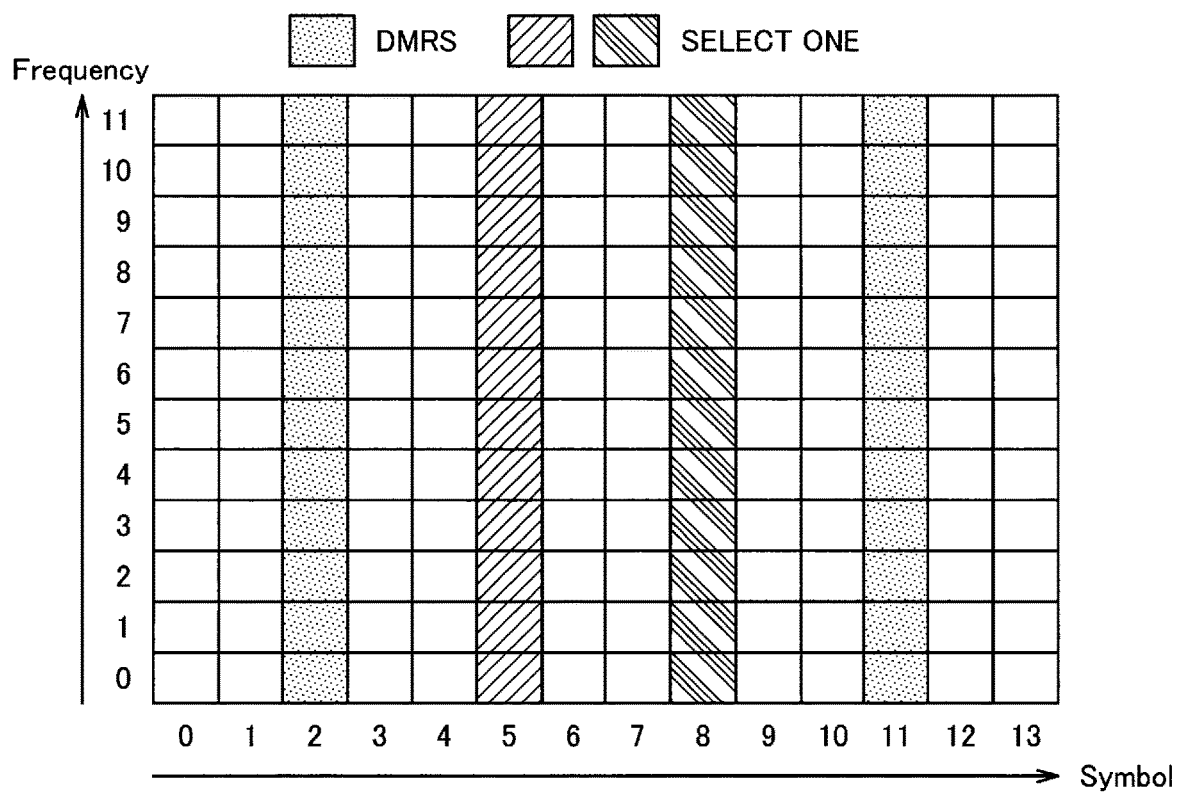

[Fig. 14]
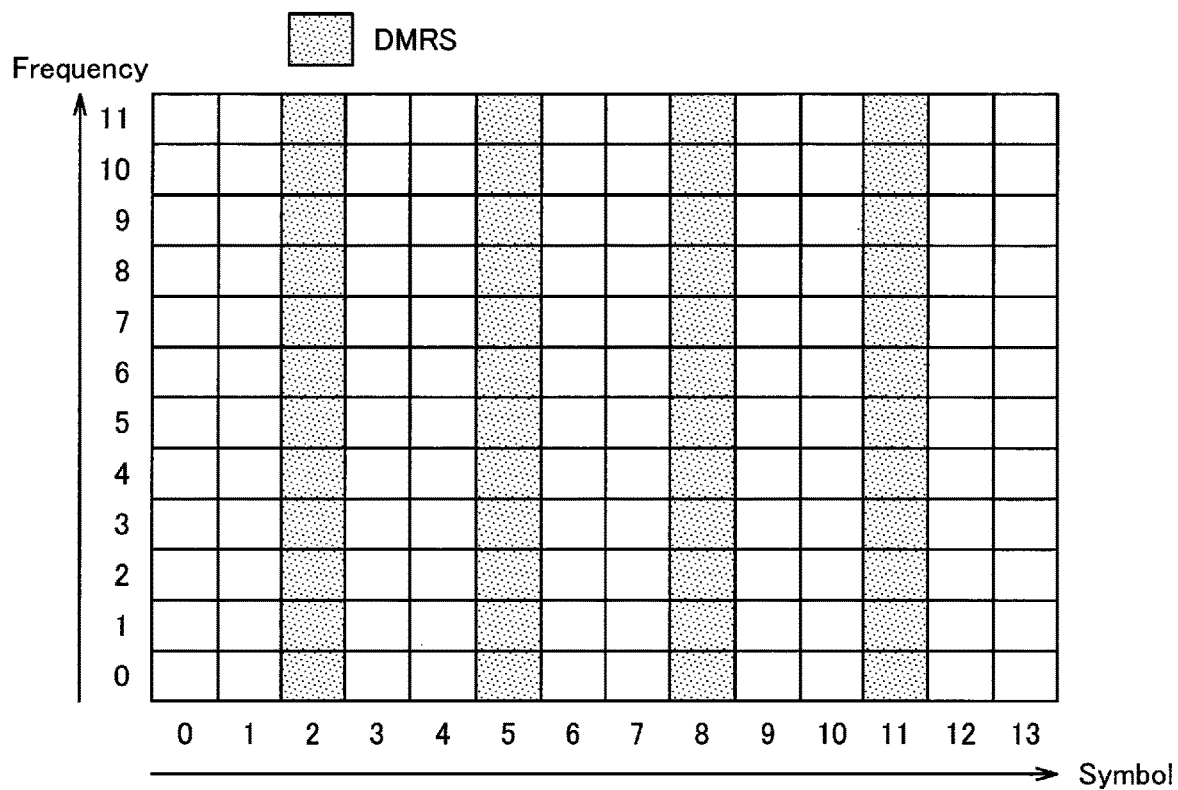
[Fig. 15]
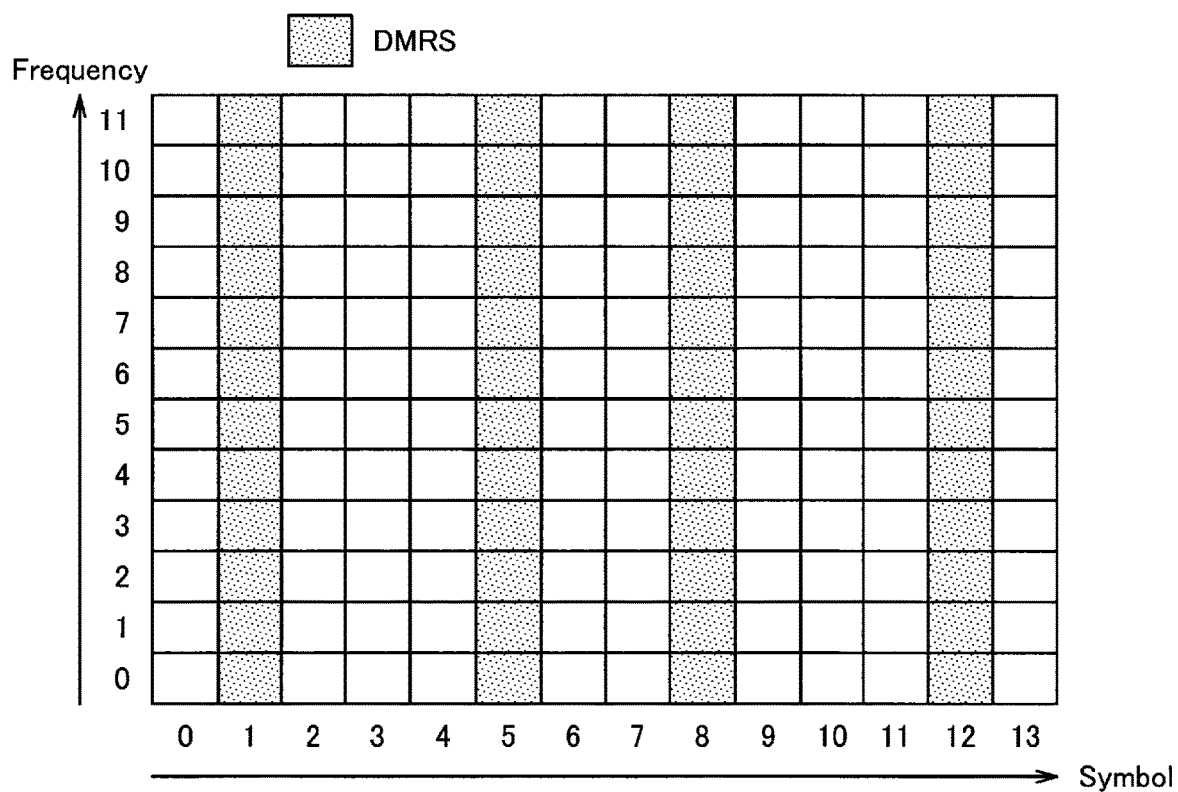

[Fig. 16]
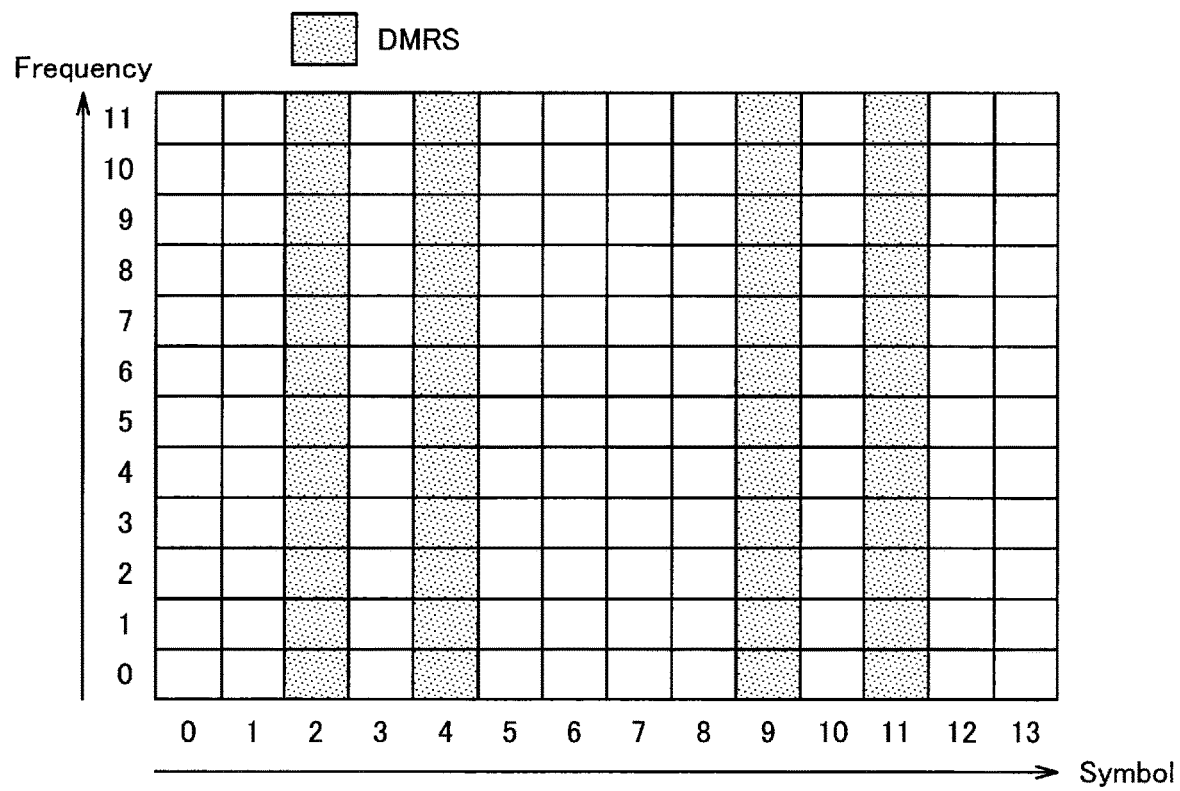
[Fig. 17]
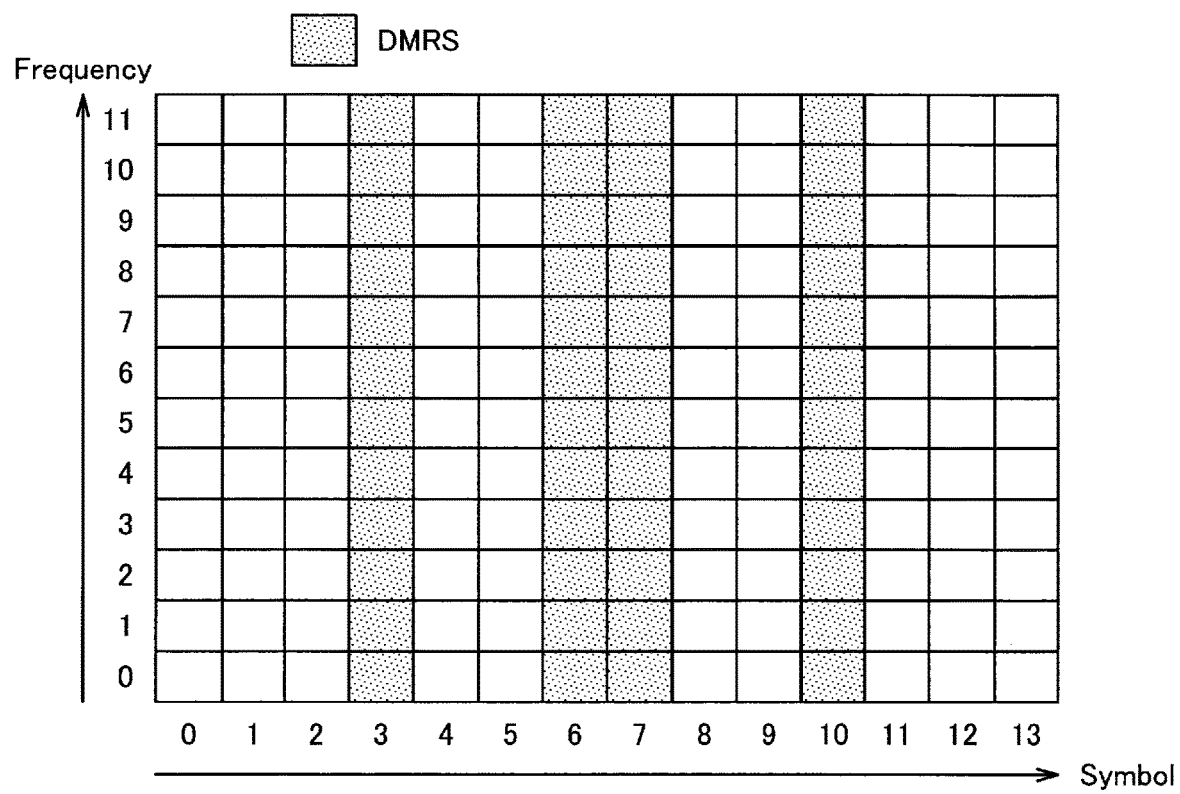

[Fig. 18]
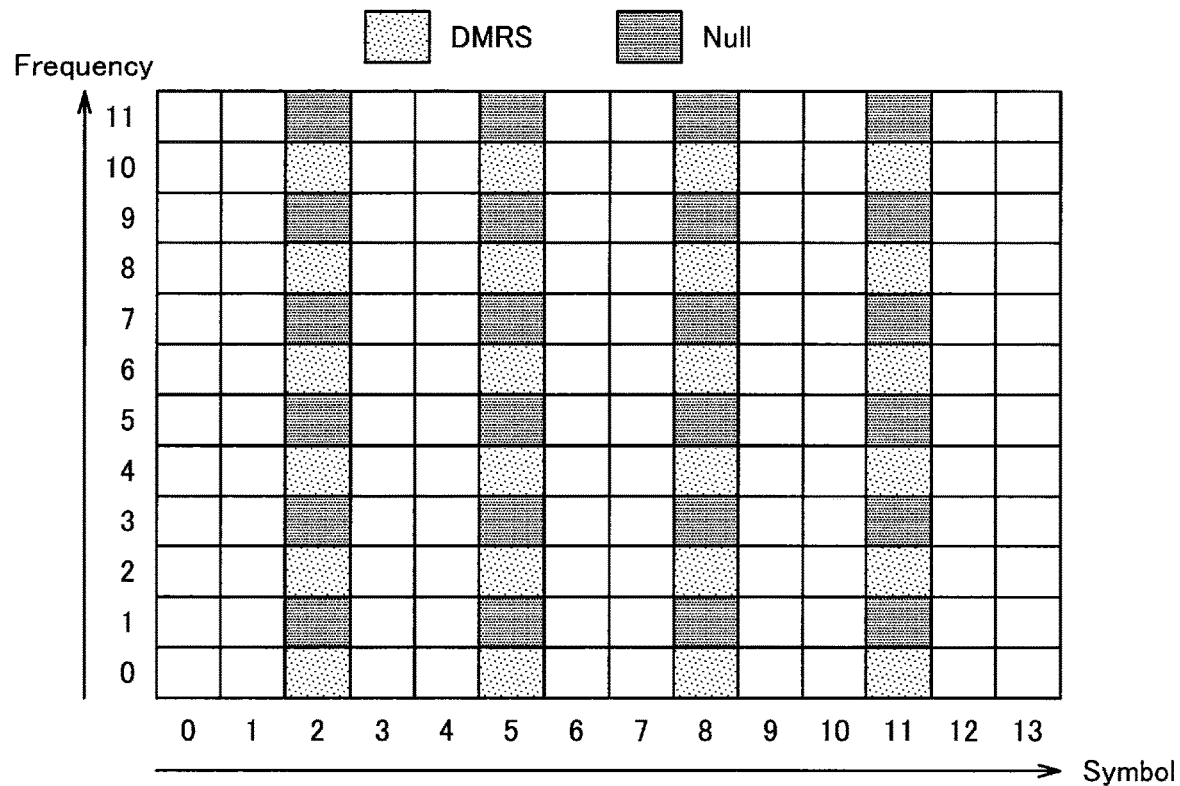
[Fig. 19]
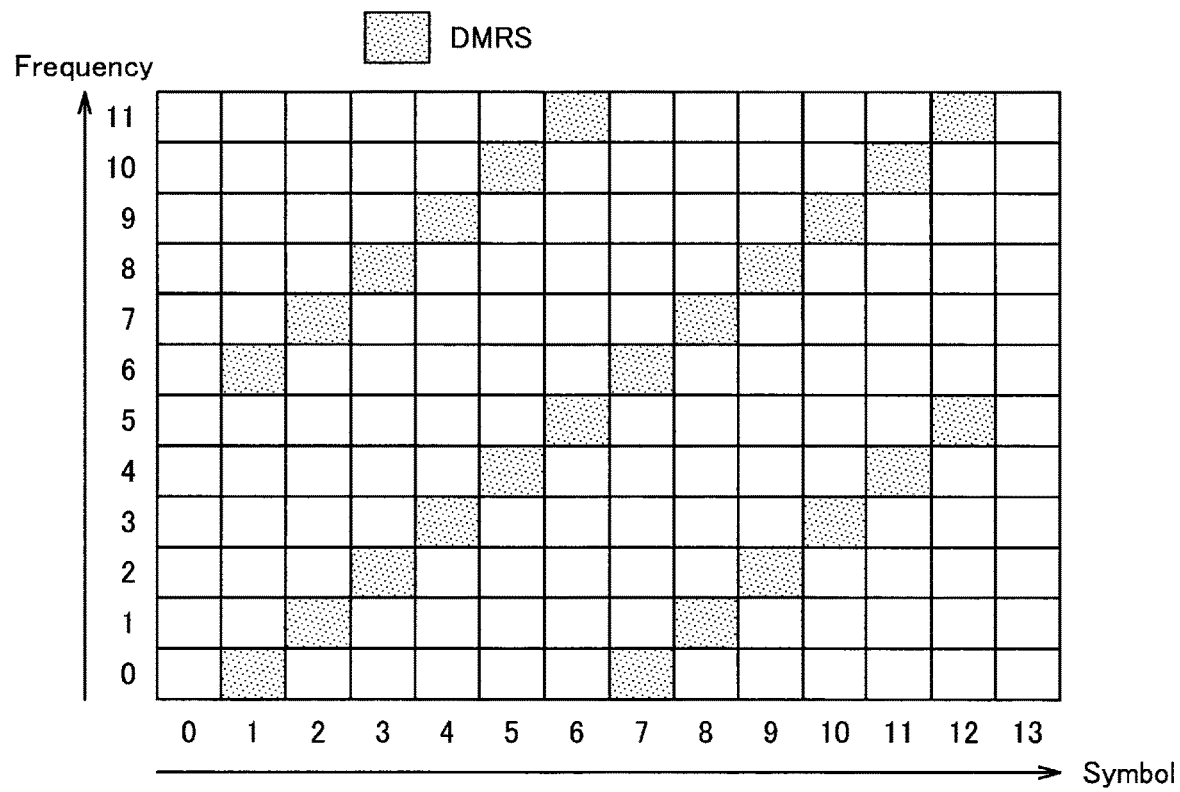

[Fig. 20]
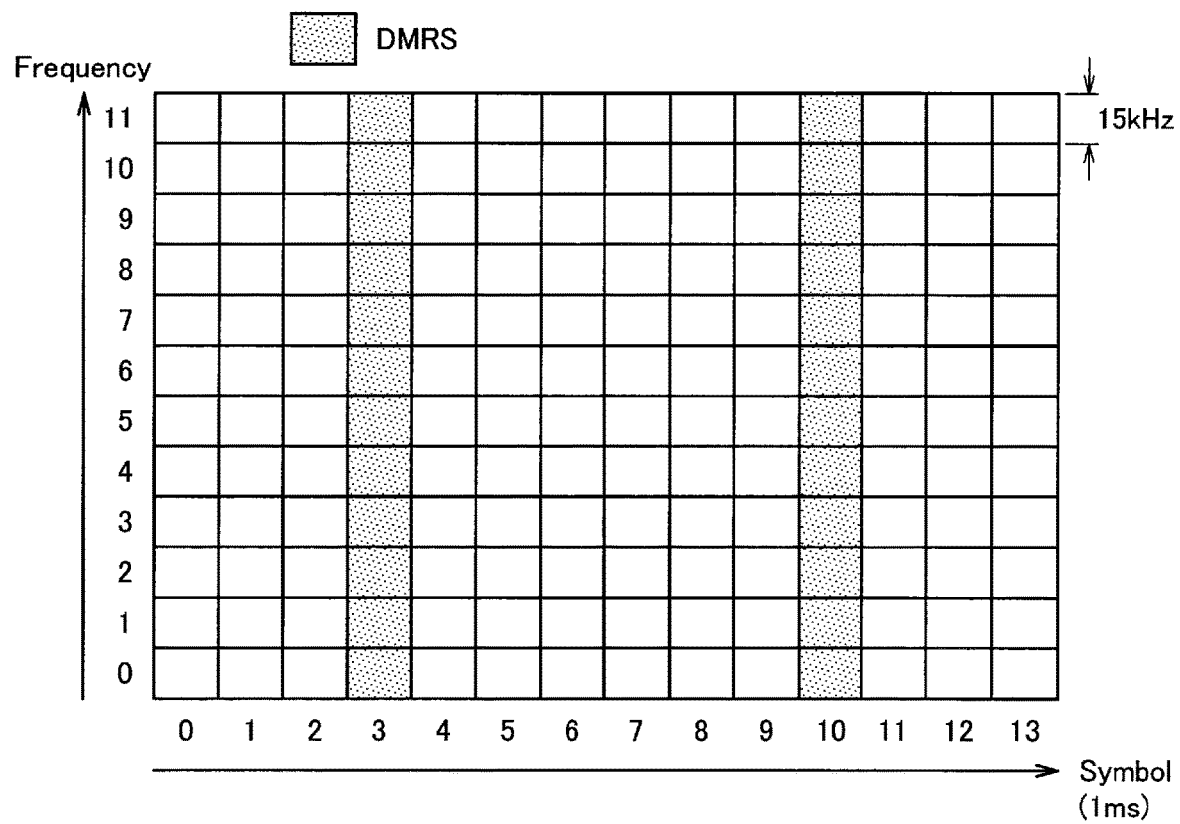

[Fig. 21]
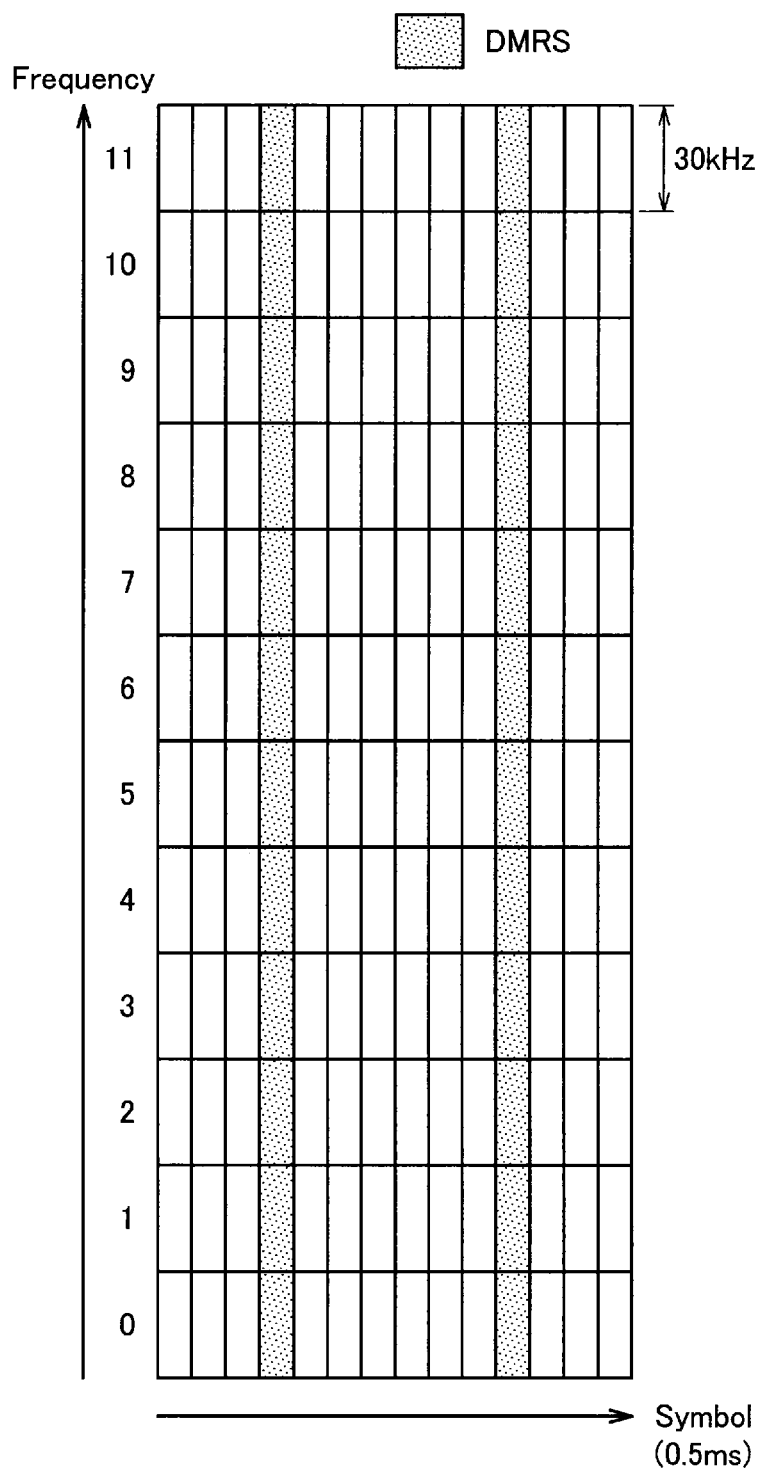

[Fig. 22]
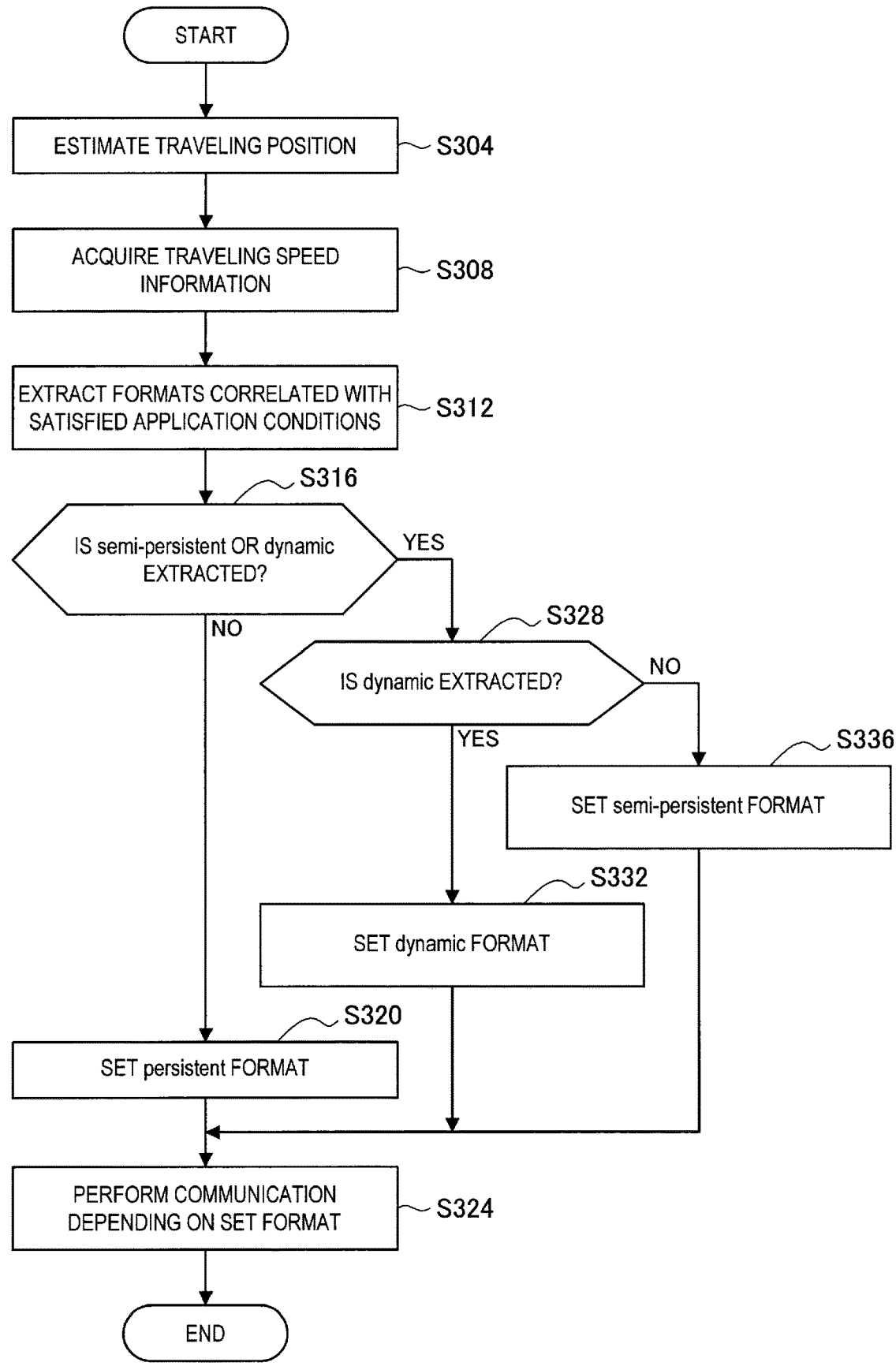

[Fig. 23]
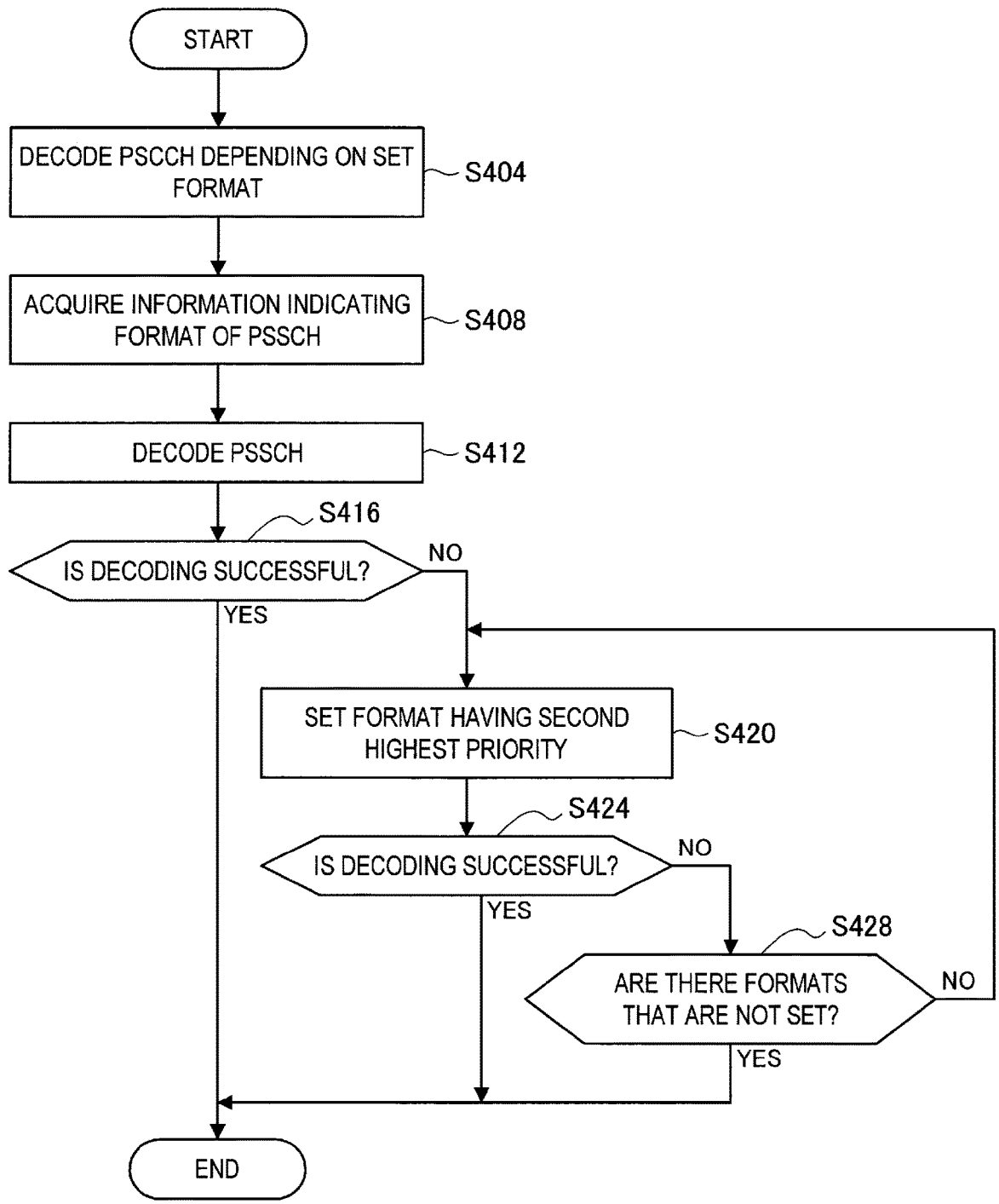

[Fig. 24]
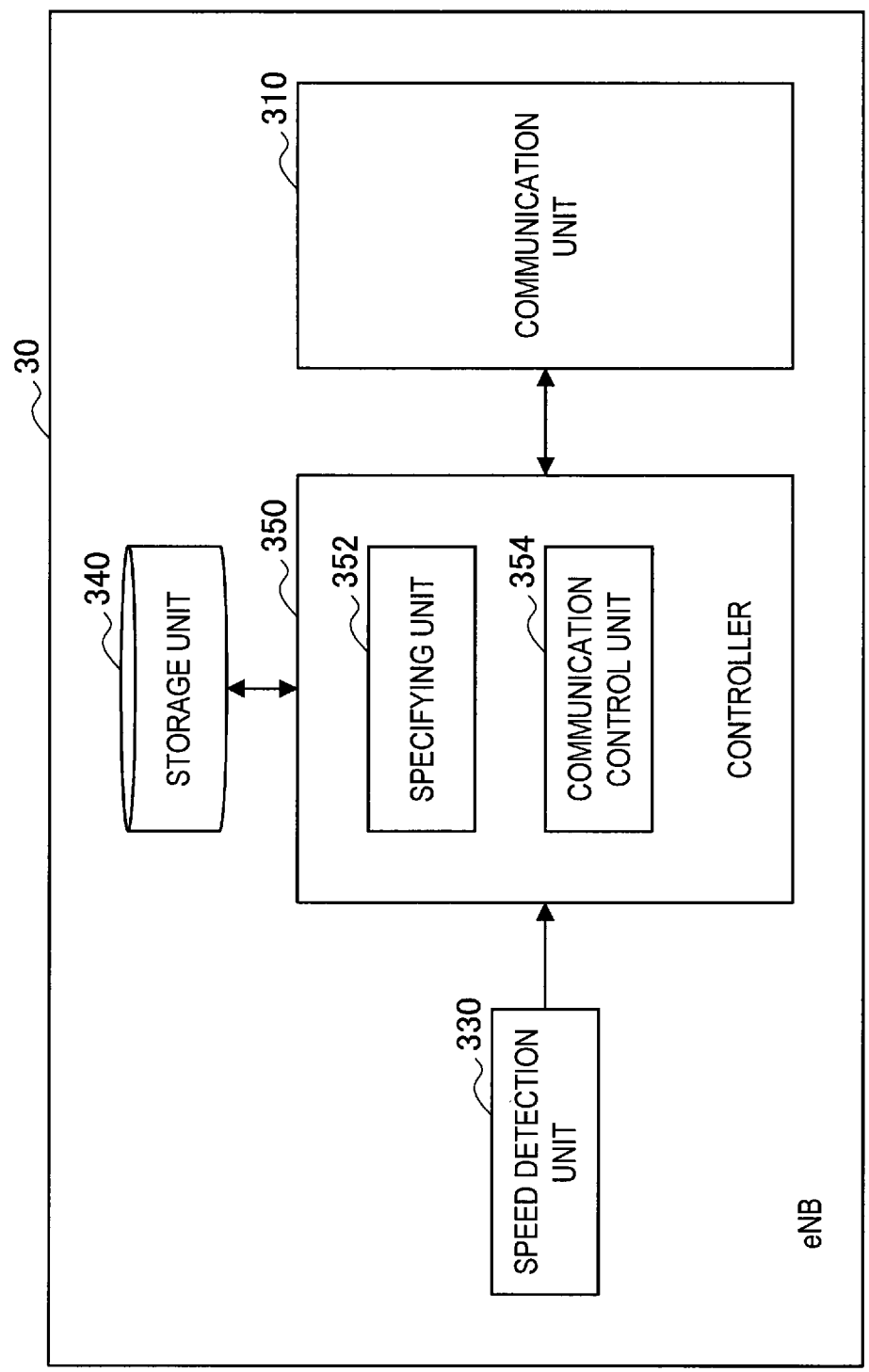

[Fig. 25]
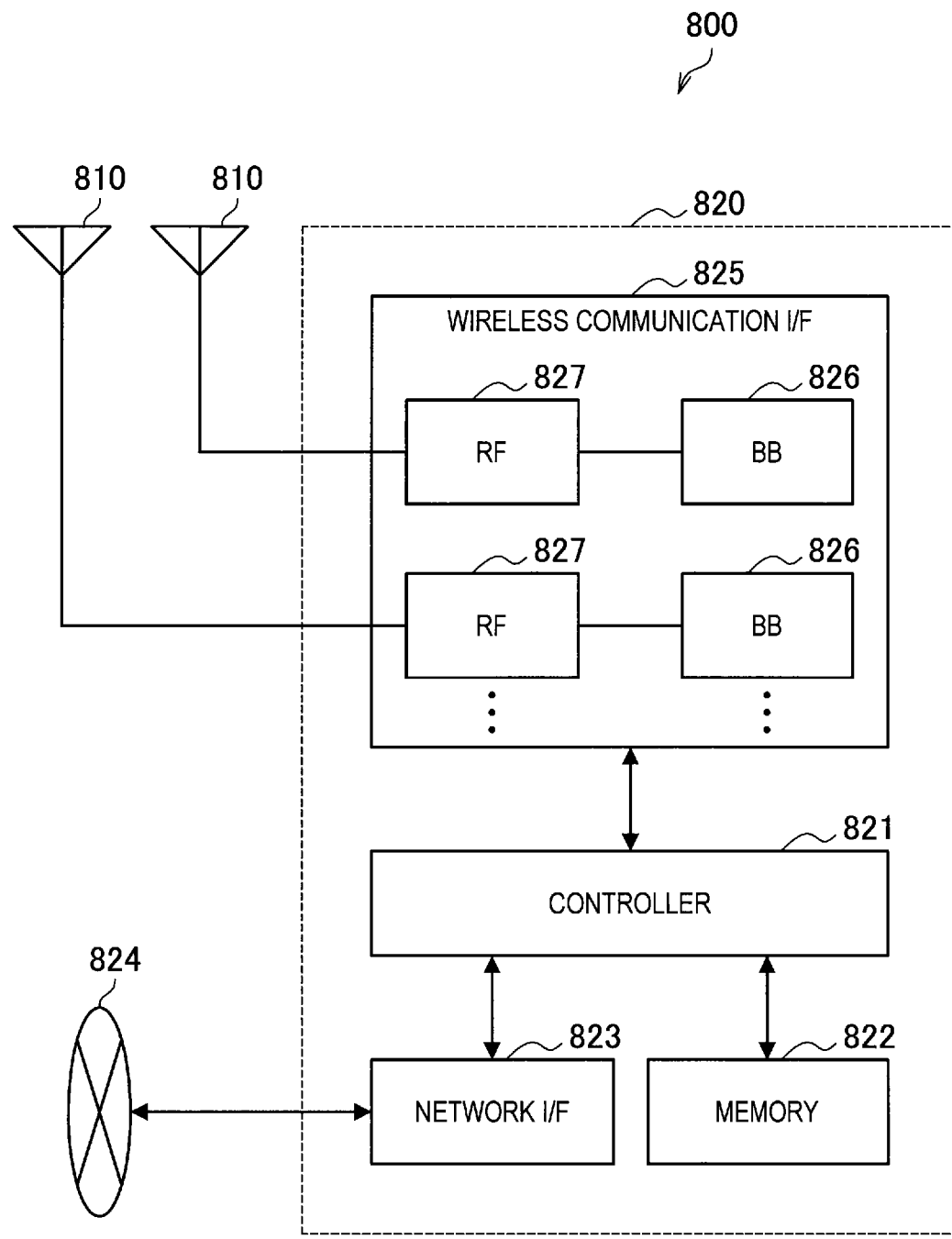

[Fig. 26]
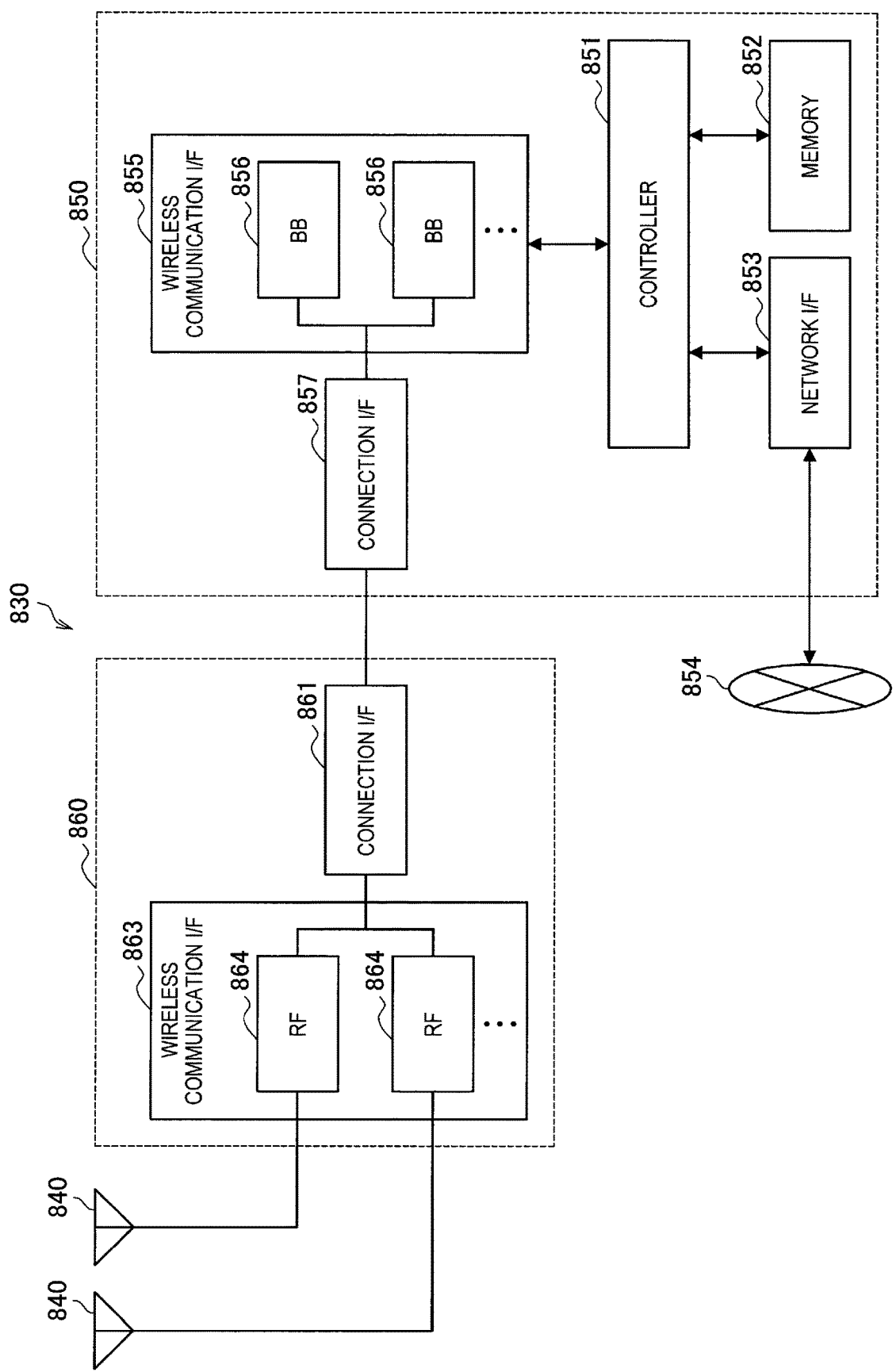

[Fig. 27]
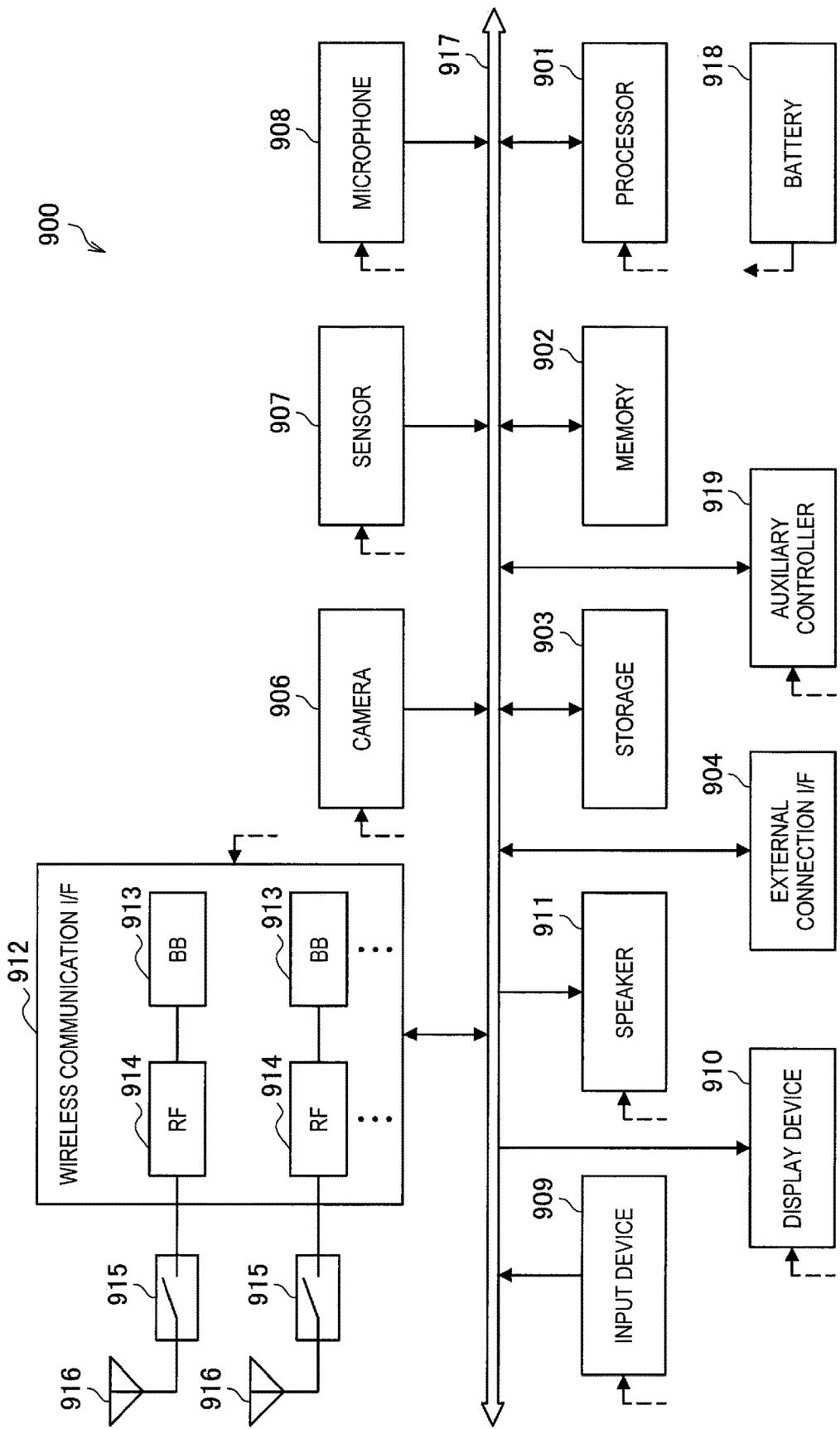

[Fig. 28]
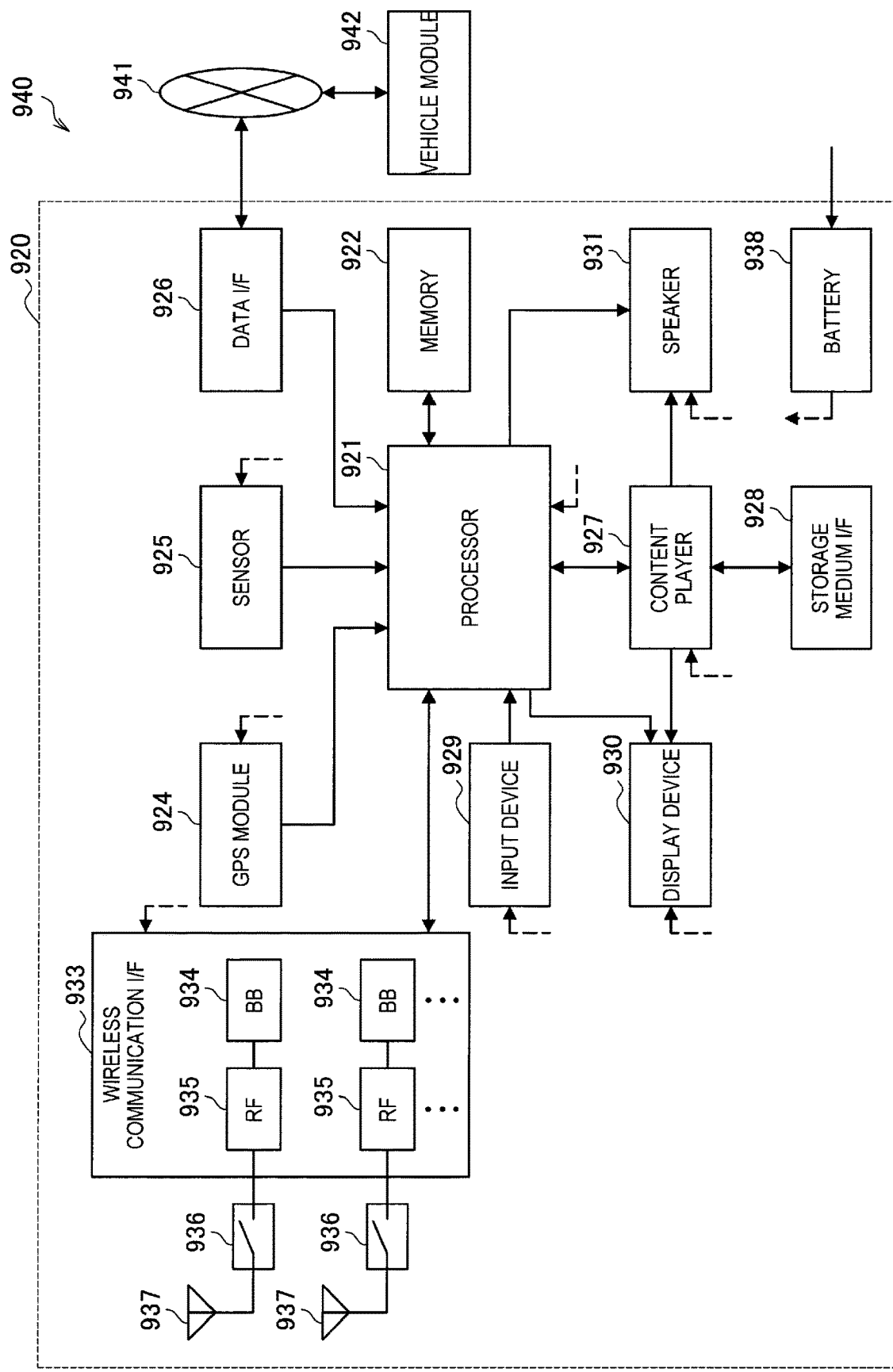

COMMUNICATION DEVICE, BASE STATION AND COMMUNICATION METHOD

CROSS REFERENCE TO RELATED APPLICATIONS

This application claims the benefit of Japanese Priority Patent Application JP 2016-020159 filed Feb. 4, 2016, the entire contents of which are incorporated herein by reference.

TECHNICAL FIELD

The present disclosure relates to a communication device, a base station and a communication method.

BACKGROUND ART

By utilizing a communication device onboard a moving object such as a vehicle, direct communication between the moving object and various target objects is realized. Communication between a communication device onboard a moving object and various other communication devices is called vehicle-to-X (V2X) communication. For V2X communication, communication systems utilizing dedicated short range communications (DSRC) have been investigated thus far, but recently, investigation into communication systems utilizing mobile phone communication standards such as Long Term Evolution (LTE) is progressing.

Before discussion of V2X communication became active, communication between communication devices, called device to device (D2D), was being investigated. Such D2D communication is disclosed in PTL1, for example.

CITATION LIST

Patent Literature

PTL 1: JP 2015-185959A

SUMMARY

Technical Problem

Here, vehicles are considered to travel at speeds of approximately 100 km/h. Accordingly, the influence of the Doppler effect on communication is a concern in V2X communication. Meanwhile, in D2D communication, communication between communication devices carried by pedestrians is the main consideration, and thus the influence of the Doppler effect on communication and measures against the Doppler effect have not been sufficiently investigated. Therefore, the present disclosure proposes measures against the Doppler effect in vehicle communication.

Solution to Problem

According to an embodiment of the present disclosure, there is provided an electronic device including circuitry configured to control vehicle-to-X (V2X) communication based on an arrangement format of reference signals for channel estimation used for the V2X communication; and dynamically set the arrangement format for the reference signals.

According to an embodiment of the present disclosure, there is provided a network node including: circuitry configured to store a group of arrangement candidate formats of a reference signal for channel estimation used for vehicle-to-X (V2X) communication; and control transmission of information indicating an arrangement candidate format included in the group of arrangement candidate formats.

According to an embodiment of the present disclosure, there is provided a communication method performed by an electronic device, the method comprising: controlling, by circuitry of the electronic device, vehicle-to-X (V2X) communication based on an arrangement format of reference signals for channel estimation used for the V2X communication; and dynamically setting, by the circuitry, the arrangement format for the reference signals.

According to an embodiment of the present disclosure, there is provided a communication method performed by a network node, the method including: storing, by a memory, a group of arrangement candidate formats of a reference signal for channel estimation used for vehicle-to-X (V2X) communication; and controlling, by circuitry of the network node, transmission of information indicating an arrangement candidate format included in the group of arrangement candidate formats.

Advantageous Effects of Invention

According to the present disclosure described above, measures against the Doppler effect in vehicle communication may be considered.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram for describing an overview of V2X communication.

FIG. 2 is an explanatory diagram of a wireless communication system according to an embodiment of the present disclosure.

FIG. 3 illustrates another example of the wireless communication system according to an embodiment of the present disclosure.

FIG. 4 illustrates another example of the wireless communication system according to an embodiment of the present disclosure.

FIG. 5 illustrates another example of the wireless communication system according to an embodiment of the present disclosure.

FIG. 6 illustrates another example of the wireless communication system according to an embodiment of the present disclosure.

FIG. 7 is an explanatory diagram of a detailed example of resource insertion of sidelink.

FIG. 8 is a functional block diagram illustrating a configuration of a UE according to a first embodiment.

FIG. 9 is an explanatory diagram of detailed examples of storage forms of formats in a storage unit.

FIG. 10 is an explanatory diagram of a detailed example of format 1.

FIG. 11 is an explanatory diagram of a detailed example of format 2.

FIG. 12 is an explanatory diagram of a detailed example of format 2.

FIG. 13 is an explanatory diagram of a detailed example of format 2.

FIG. 14 is an explanatory diagram of a detailed example of format 3.

FIG. 15 is an explanatory diagram of a detailed example of format 3.

FIG. 16 is an explanatory diagram of a detailed example of format 3.

FIG. 17 is an explanatory diagram of a detailed example of format 3.

FIG. 18 is an explanatory diagram of a modified example of a format.

FIG. 19 is an explanatory diagram of a modified example of a format.

FIG. 20 is an explanatory diagram of a modified example of a format.

FIG. 21 is an explanatory diagram of a modified example of a format.

FIG. 22 is a flowchart illustrating an operation of a UE according to the first embodiment.

FIG. 23 is a flowchart illustrating a reception operation of a UE.

FIG. 24 is an explanatory diagram of a configuration of an eNB according to a second embodiment.

FIG. 25 is a block diagram illustrating a first example of an approximate configuration of an eNB to which technology according to the present disclosure is applicable.

FIG. 26 is a block diagram illustrating a second example of an approximate configuration of an eNB to which technology according to the present disclosure is applicable.

FIG. 27 is a block diagram illustrating an example of an approximate configuration of a smartphone to which technology according to the present disclosure is applicable.

FIG. 28 is a block diagram illustrating an example of an approximate configuration of a car navigation device to which technology according to the present disclosure is applicable.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in this specification and the appended drawings, multiple structural elements having substantially the same function and structure may in some cases be distinguished by different letters appended to the same sign. For example, multiple elements having substantially the same function and structure or logical significance are distinguished as UEs 20A, 20B, 20C, and so on as necessary. On the other hand, when not particularly distinguishing each of multiple structural elements having substantially the same function and structure, only the same sign will be given. For example, when not particularly distinguishing UEs 20A, 20B, 20C, each of the UEs 20A, 20B, 20C will be designated simply the UE 20.

Hereinafter, a description of the present disclosure will be given in the following order.
A. Introduction
B. Overview of Wireless Communication System
C. First Embodiment
C-1. Configuration of UE
C-2. Detailed Example of Formats
C-3. Operation of UE
D. Second Embodiment
E. Operation Examples
F. Application Examples
G. Conclusion <<A. Introduction>>

By utilizing a communication device onboard a moving object such as a vehicle, direct communication between the moving object and various target objects is realized. Vehicle communication between a vehicle and various target objects is called vehicle-to-X (V2X) communication. FIG. 1 is an explanatory diagram for describing an overview of V2X communication. As illustrated in FIG. 1, V2X communication may be vehicle-to-vehicle (V2V) communication, vehicle-to-infrastructure (V2I) communication, vehicle-to-pedestrian (V2P) communication, vehicle-to-home (V2H) communication, or vehicle to network (V2N) communication, for example.

The communication target of a vehicle in V2V communication may be a passenger vehicle, a commercial or fleet vehicle, an emergency vehicle, or a transit vehicle, for example. Also, the communication target of a vehicle in V2I communication may be a data centre, a fleet or freight management centre, a traffic management centre, a weather service, a rail operation centre, a parking system, or a toll system, for example. Also, the communication target of a vehicle in V2P communication may be a cyclist, a pedestrian shelter, or a motorcycle, for example. Also, the communication target of a vehicle in V2H communication may be a home network, a garage, or enterprise or dealer networks, for example. In addition, a communication target of a vehicle in V2N communication may be a cellular network, for example.

The following is a list of examples of use cases of V2X.
1. Forward collision warning
2. Control loss warning
3. V2V Use case for emergency vehicle warning
4. V2V emergency stop use case
5. Cooperative adaptive cruise control
6. V2I emergency stop use case
7. Queue warning
8. Road safety services
9. Automated parking system
10. Wrong way driving warning
11. V2V message transfer under operator control
12. Pre-crash sensing warning
13. V2X in areas outside network coverage
14. V2X road safety service via infrastructure
15. V2I/V2N traffic flow optimization
16. Curve speed warning
17. Warning to pedestrian against pedestrian collision
18. Vulnerable road user (VRU) safety
19. V2X by UE type RSU
20. V2X minimum QoS
21. Use case for V2X access when roaming
22. Pedestrian road safety via V2P awareness messages
23. Mixed use traffic management
24. Enhancing positional precision for traffic participants <<B. Overview of wireless communication system>>

A wireless communication system according to an embodiment of the present disclosure is a wireless communication system applied to the aforementioned V2X communication. A configuration of the wireless communication system according to an embodiment of the present disclosure will be described with reference to FIG. 2.

FIG. 2 is an explanatory diagram of the wireless communication system according to an embodiment of the present disclosure. As illustrated in FIG. 2, the wireless communication system according to an embodiment of the present disclosure includes a UE 20, a vehicle 22 and an eNB 30.

The eNB 30 is a cellular base station that provides a cellular communication service to the UE 20 positioned inside a cell. For example, the eNB 30 schedules resources for the UE 20 to communicate by, and notifies the UE 20 of the scheduled resources. Additionally, the eNB 30 conducts uplink communication or downlink communication with the UE 20 in the relevant resources.

The UE 20 is a communication device that is mounted on the vehicle 22 and moves along with traveling of the vehicle 22. The UE 20 has a function of communicating with the eNB 30 according to control by the eNB 30. In addition, the UE 20 according to the present embodiment may perform direct communication (V2V communication) with a UE 20 aboard another vehicle 22. For example, as illustrated in FIG. 2, a UE 20A aboard a vehicle 22A may transmit data to a UE 20B aboard a vehicle 22B through sidelink communication.

Although FIG. 2 shows a four-wheeled vehicle as the vehicle 22, the embodiment of the present disclosure is applicable to other vehicles such as a two-wheeled vehicle, and a three-wheeled vehicle.

(Variations)

The wireless communication system according to the embodiment of the present disclosure may be realized in modes different from the mode illustrated in FIG. 2. Other examples of the wireless communication system according to the embodiment of the present disclosure will be described with reference to FIGS. 3 to 6.

FIGS. 3 to 6 illustrate other examples of the wireless communication system according to the embodiment of the present disclosure. In an example, the UE 20 communicates with another UE 20 via the eNB 30. Specifically, as illustrated in FIG. 3, the UE 20A may transmit data to the eNB 30 on uplink and the eNB 30 may transmit data to the UE 20B on downlink In another example, the UE 20 communicates with another UE 20 via base stations such as the eNB 30 and a road side unit (RSU). Specifically, as illustrated in FIG. 4, the UE 20A may transmit data to an RSU 50 on sidelink, the RSU 50 may transmit the data to the eNB 30 on uplink and the eNB 30 may transmit the data to the UE 20B on downlink Otherwise, as illustrated in FIG. 5, the UE 20A may transmit data to the eNB 30 on uplink, the eNB 30 may transmit the data to the RSU 50 on downlink and the RSU 50 may transmit the data to the UE 20B on sidelink. The RSU 50 is a communication device installed on the side of a road. The RSU 50 may perform bi-directional communication with the vehicle 22 or the UE 20 aboard the vehicle 22. Although FIG. 4 individually shows the RSU 50 and the eNB 30, a node including the function of the RSU 50 and the function of the eNB 30 may be provided.

In another example, the UE 20 communicates with another UE 20 via the RSU 50 without the eNB 30. Specifically, as illustrated in FIG. 6, the UE 20A may transmit data to the RSU 50 on sidelink and the RSU 50 may transmit the data to the UE 20B on sidelink As illustrated in FIG. 7, a resource pool 62 (resources for control communication) for control channels and a resource pool 64 (resources for data communication) for data channels are arranged in sidelink. The UE 20 communicates a physical sidelink control channel (PSCCH) in the resource pool 62 for control channels and communicates a physical sidelink shared channel (PSSCH) in the resource pool 64 for data channels. While FIG. 7 shows an example in which the resource pool 62 for control channels and the resource pool 64 for data channels are arranged in a time division manner, the resource pool 62 for control channels and the resource pool 64 for data channels may be arranged in a frequency division manner. Further, the resource pool 64 for a plurality of data channels may be arranged for the resource pool 62 for one control channel. In addition, a primary sidelink synchronization signal/secondary sidelink synchronization signal (PSSS/SSSS) which are synchronization signals and a physical sidelink broadcast channel (PSBCH) indicating system information may be arranged in sidelink (Background)

In the aforementioned V2X communication, for example, predetermined performance shown in the following table 1 may be required.

TABLE 1

Performance example in V2X communication

| | Effective range | Absolute velocity of a UE supporting V2X Services | Relative velocity between 2 UEs supporting V2X Services | Maximum tolerable latency | Minimum radio layer message reception reliability (probability that the recipient gets it within 100 ms) | Example Cumulative transmission reliability |
|---|---|---|---|---|---|---|
| #1 (suburban) | 200 m | 50 kmph | 100 kmph | 100 ms | 90% | 99% |
| #2 (freeway) | 320 m | 160 kmph | 280 kmph | 100 ms | 80% | 96% |
| #3 (autobahn) | 320 m | 280 kmph | 280 kmph | 100 ms | 80% | 96% |
| #4 (NLOS/urban) | 150 m | 50 kmph | 100 kmph | 100 ms | 90% | 99% |
| #5 (urban intersection) | 50 m | 50 kmph | 100 kmph | 100 ms | 95% | — |
| #6 (campus/shopping area) | 50 m | 30 kmph | 30 kmph | 100 ms | 90% | 99% |

To realize the aforementioned performance, standardization of the physical layer of V2X communication is already started in 3GPP. Particularly, standardization of V2I/N and V2P is conducted based on standardization of V2V communication.

le;2qAs a base technology of V2X communication, device-to-device (D2D) communication standardized in the past in 3GPP may be considered. D2D communication is communication without a base station and thus may be enhanced and adapted to V2V communication and V2P communication (applicable to part of V2I communication). Such an interface between UEs is called a PC5 interface.

Further, in V2I communication and V2N communication, enhancement and adaptation of communication between a base station and a UE is considered. Such an interface between a base station and a UE is called a Uu interface.

To realize V2X communication, it is important to enhance the PC5 interface and the Uu interface to satisfy the aforementioned performance. For example, enhancement such as improvement of resource allocation, measures against the Doppler effect, establishment of a synchronization method, realization of low power consumption communication and realization of low delay communication is desirable.

Here, in V2X communication, a UE of at least one side is moved according to travel of a vehicle and thus a relative speed between communication devices is higher than a relative speed supposed in D2D communication. Accordingly, the present disclosure particularly focuses on measures against the Doppler effect. Since a relative speed of two vehicles traveling toward each other corresponds to the sum of traveling speeds of the respective vehicles, the relative speed of the two vehicles amounts to 280 km/h when each vehicle travels at 140 km/h. For V2X communication, measures against the Doppler effect generated at such a relative speed of 280 km/h are desirable.

As a use case of V2V communication between vehicles traveling toward each other, communication of reverse traveling information may be considered. For example, when a certain vehicle travels in reverse along a traveling lane and reverse travel information indicating reverse travel is transmitted from the vehicle, a vehicle traveling along the traveling lane in a normal direction may receive the reverse travel information through V2V communication with the vehicle traveling in reverse.

As measures against the Doppler effect in such V2X/V2V communication, use of a format in which the frequency of insertion of a demodulation reference signal (DMRS) that is an example of reference signals for channel estimation is increased may be considered.

However, constant use of the format in which the DMRS insertion frequency is increased is inefficient from the viewpoint of effective utilization of resources. For example, when a vehicle travels at a low speed in traffic, a DMRS insertion frequency capable of bearing even a relative speed of 280 km/h is excessive. In addition, countries and areas have different speed limits, and thus a relative speed of 280 km/h may not be supported in a county or area. In V2I communication, it is supposed that a communication device of one side is stopped and thus a relative speed of 280 km/h is not considered.

Furthermore, the degree of the influence of the Doppler effect on communication decreases as an operation frequency becomes lower. For example, the degree of the influence of the Doppler effect on communication at an operation frequency of 700 MHz is less than the degree of the influence of the Doppler effect on communication at an operation frequency of 6 GHz. When the operation frequency is 700 MHz, accordingly, the DMRS insertion frequency for the operation frequency of 6 GHz becomes overhead.

The inventors devised embodiments of the present disclosure in view of the above circumstances. According to embodiments of the present disclosure, it may be possible to cope with the Doppler effect more efficiently. The embodiments of the present disclosure will be sequentially described in detail.

<<C. First Embodiment>>
<C-1. Configuration of UE>

FIG. 8 is a functional block diagram illustrating a configuration of the UE 20 according to a first embodiment. As illustrated in FIG. 8, the UE 20 according to the first embodiment includes a communication unit 210, a position estimation unit 220, a speed acquisition unit 230, a storage unit 240 and a controller 250.

(Communication Unit)

The communication unit 210 is an interface of other communication devices and serves as a transmission unit and a reception unit that transmit/receive various signals to/from other communication devices. For example, the communication unit 210 receives a synchronization signal, a control signal and a data signal from the eNB 30. In addition, the communication unit 210 may communicate with another UE 20 and RSU 50 on sidelink.

(Position Estimation Unit)

The position estimation unit 220 estimates a position of the UE 20, that is, a traveling position of the vehicle 22. For example, the position estimation unit 220 may estimate a position on the basis of a global navigation satellite system (GNSS) signal including a navigation message transmitted from a GPS satellite. Otherwise, the position estimation unit 220 may estimate a position through triangulation using received strength of electric waves transmitted from a WiFi base station. While FIG. 8 shows the position estimation unit 220 as a component of the UE 20, the function of the position estimation unit 220 may be mounted outside (e.g., vehicle 22) of the UE 20 and the UE 20 may receive a position estimation result from the outside.

(Speed Acquisition Unit)

The speed acquisition unit 230 acquires traveling speed information of the vehicle 22 in which the UE 20 is mounted. For example, the speed acquisition unit 230 may acquire the traveling speed information from the vehicle 22. Otherwise, the speed acquisition unit 230 may be configured as sensors such as an acceleration sensor and a gyro sensor and may acquire the traveling speed information of the vehicle 22 in which the UE 20 is mounted on the basis of outputs from the sensors.

(Storage Unit)

The storage unit 240 stores a plurality of formats as a group of DMRS arrangement candidate formats. Format storage forms in the storage unit 240 will be described in more detail with reference to FIG. 9.

FIG. 9 is an explanatory diagram of detailed examples of format storage forms in the storage unit 240. As shown in FIG. 9, the storage unit 240 stores formats by correlating the formats with "allocation type," "application condition," "channel type" and "frequency." "Allocation type" may be "persistent," "semi-persistent" or "dynamic". The respective allocation types of "persistent," "semi-persistent" and "dynamic" have different priories, and priority of each allocation type is considered when a setting unit 252, which will be described below, sets a format.

With respect to formats 1 to 3 shown in FIG. 9, the DMRS insertion frequency of 2 is higher than the DMRS insertion frequency of format 1 and the DMRS insertion frequency of format 3 is higher than the DMRS insertion frequency of format 2. Formats 1 to 3 will be described in detail below with reference to FIGS. 10 to 17.

"Application condition" indicates an application condition of a format correlated with a relevant application condition. For example, a semi-persistent format is correlated with an application condition related to a traveling position, and a dynamic format is correlated with an application condition related to a traveling speed. In FIG. 9, "area A" is shown as an application condition correlated with a semi-persistent format and "200 km/h or lower" is shown as an application condition correlated with a dynamic format. In the specification, persistent formats correspond to an example of a first arrangement candidate format, semi-persistent formats correspond to an example of a second arrangement candidate format, and dynamic formats correspond to an example of a third arrangement candidate format.

"Channel type" indicates the type of a channel corresponding to an application target of a format correlated with a relevant channel type. Channel types may be a broadcast channel, a control channel and a data channel shown in FIG. 9. Since a PSCCH transmitted on a control channel has a higher level of importance in communication than a PSSCH transmitted on a data channel, the control channel and the data channel may be correlated with different formats. Furthermore, a plurality of channels may be combined and correlated with a format in units of resource pools. Correlation of different formats is exemplified. Comparing entry E1 and entry E2 having "allocation type" corresponding to "semi-persistent," "application condition" corresponding to "area A," and "frequency" corresponding to "frequency A" in FIG. 9, for example, format 1 is correlated with a control channel (E1) and format 2 having a higher DMRS insertion frequency than format 1 is correlated with a data channel (E2). A broadcast channel may be correlated with only a persistent format. In addition, a PSBCH transmitted on a broadcast channel has a higher level of importance in communication than a PSCCH transmitted on a control channel and a PSSCH transmitted on a data channel, and thus the broadcast channel may be correlated with a format having a higher DMRS insertion frequency than the control channel.

"Frequency" indicates a frequency corresponding to an application target of a format correlated to a relevant frequency. For example, the degree of the influence of the Doppler effect on communication at an operation frequency of 700 MHz is lower than the degree of the influence of the Doppler effect on communication at an operation frequency of 6 GHz. Accordingly, when the system is operated with multiple carriers, different formats may be correlated with frequencies. For example, comparing entries E1 and E3 having "allocation type" corresponding to "semi-persistent," "application condition" corresponding to "area A" and "channel type" corresponding to a control channel in FIG. 9, format 1 is correlated with "frequency A" (E1) and format 2 having a higher DMRS insertion frequency than format 1 is correlated with "frequency B" higher than "frequency A" (E3).

The group of DMRS arrangement candidate formats, described with reference to FIG. 9, may be set when the UE 20 is manufactured or may be signaled from a network. For example, the eNB 30 may signal persistent arrangement candidate formats and the RSU 50 may signal semi-persistent arrangement candidate formats. Furthermore, while FIG. 9 shows dynamic formats with respect to control channels, it is desirable that the dynamic formats with respect to control channels be identical to persistent or semi-persistent formats, as will be described below, and thus the dynamic formats with respect to control channels may not be provided. When a format is signaled from the network, the format may be notified of through an SIB, RRC connection reconfiguration message or the like.

(Controller)

The controller 250 controls the overall operation of the UE 20. Particularly, the controller 250 according to the present embodiment has functions of the setting unit 252 and a communication control unit 254.

The setting unit 252 dynamically sets a format for DMRS arrangement. For example, the setting unit 252 may set a format correlated with a satisfied application condition from among the group of arrangement candidate formats described with reference to FIG. 9. Here, a case in which a plurality of formats are correlated with the satisfied application condition may be supposed. In this case, the setting unit 252 may set a format correlated with an allocation type having higher priority on the basis of allocation types of the respective formats.

For example, when the UE 20 that intends to perform communication through "data channel" at "frequency A" is present in "area A" and travels at "20 km/h or lower," application conditions of entries E0, E2 and E4 are satisfied. In this case, the setting unit 252 may set format 1 correlated with entry E4 corresponding to the allocation type of "dynamic" on the basis of the aforementioned priority. Various examples of setting will be described in <E. Operation Examples>.

The communication control unit 254 controls transmission processing and reception processing of the communication unit 210. Particularly, the communication control unit 254 according to the present embodiment controls V2X communication performed by the communication unit 210 depending on a format set by the setting unit 252. For example, the communication control unit 254 inserts DMRSs into a PSBCH, a PSCCH and a PSSCH depending on the format set by the setting unit 252. In addition, the communication control unit 254 attempts to decode a PSBCH, a PSCCH and a PSSCH received by the communication unit 210 depending on the format set by the setting unit 252.

Here, since the PSCCH has a high level of importance in communication, it is desirable that a control channel on which the PSCCH is transmitted be assigned common formats for "semi-persistent" and "dynamic" as shown in FIG. 9. On the other hand, a data channel on which the PSSCH is transmitted may be assigned different formats for "semi-persistent" and "dynamic." Accordingly, if formats are switched between "semi-persistent" and "dynamic," transmission of the PSSCH may fail while transmission of the PSCCH is successfully performed.

Accordingly, the communication control unit 254 may transmit information indicating a format applied to a data channel, that is, a format set for transmission of the PSSCH, through a PSCCH. According to this configuration, a transmitting side and a receiving side may share the format applied to the data channel irrespective of whether formats are switched between "semi-persistent" and "dynamic." Accordingly, it may be possible to reduce DMRS overhead in the data channel by changing the format of the data channel aggressively while securing transmission of the data channel.

<C-2. Detailed Examples of Formats>

The configuration of the UE 20 according to the present embodiment has been described. Next, detailed examples of formats 1 to 3 shown in FIG. 9 will be described.

In an example, format 1 is a format in which the DMRS is arranged at two symbols within 1 ms. Format 2 is a format in which the DMRS is arranged at three symbols within 1 ms. Format 3 is a format in which the DMRS is arranged at four symbols within 1 ms. A detailed example of format 1 will be described with reference to FIG. 10, detailed examples of format 2 will be described with reference to FIGS. 11 to 13 and detailed examples of format 3 will be described with reference to FIGS. 14 to 17.

FIG. 10 is an explanatory diagram of a detailed example of format 1. In format 1 shown in FIG. 10, the DMRS is arranged at symbol #3 and symbol #10. While format 1 is sufficient for a case of low speed movement such as 20 km/h or lower, format 1 may be insufficient in a case in which a relative speed amounts to approximately 280 km/h.

FIGS. 11 to 13 are explanatory diagrams of detailed examples of format 2. In the example shown in FIG. 11, the DMRS is disposed at any of symbols #6 and #7 in addition to symbols #2 and #11. In the example shown in FIG. 12, the DMRS is disposed at any of symbols #6 and #7 in addition to symbols #3 and #10. In the example shown in FIG. 13, the DMRS is disposed at any of symbols #5 and #8 in addition to symbols #2 and #11. Format 2 is considered to be able to tolerate higher speed movement than format 1.

FIGS. 14 to 17 are explanatory diagrams of detailed examples of format 3. In the example shown in FIG. 14, the DMRS is disposed at symbols #2, #5, #8 and #11. In the example shown in FIG. 15, the DMRS is disposed at symbols #1, #5, #8 and #12. In the example shown in FIG. 16, the DMRS is disposed at symbols #2, #4, #9 and #11. In the example shown in FIG. 17, the DMRS is disposed at symbols #3, #6, #7 and #10. Format 3 is considered to tolerate a relative speed of approximately 280 km/h.

While the formats in which the DMRS is arranged in all resource elements of a symbol have been described above, format configurations are not limited to the aforementioned examples. For example, a comb type format as illustrated in FIG. 18 and a stepped format as illustrated in FIG. 19 may be included in the group of arrangement candidate formats. In addition, a format having a changed subcarrier width and a format having a changed symbol width, as illustrated in FIGS. 20 and 21, may be included in the group of arrangement candidate formats.

<C-3. Operation of UE>

Next, the operation of the UE 20 according to the present embodiment will be arranged with reference to FIGS. 22 and 23.

FIG. 22 is a flowchart illustrating the operation of the UE 20 according to the present embodiment. As illustrated in FIG. 22, the UE 20 estimates a traveling position through the position estimation unit 220 (S304) and acquires traveling speed information through the speed acquisition unit 230 (S308).

Subsequently, the setting unit 252 extracts formats correlated with satisfied applications condition from the storage unit 240 (S312). For example, the setting unit 252 extracts a persistent format, a semi-persistent format correlated with an application condition indicating an area including the traveling position, and a dynamic format correlated with an application condition corresponding to the traveling speed.

Additionally, when a plurality of formats are extracted, the setting unit 252 sets a format on the basis of priority of allocation types of the respective formats. For example, priority of "dynamic" is highest and priority of "persistent" is lowest, as described above. In this case, the setting unit 252 sets the extracted persistent format (S320) when the semi-persistent and dynamic formats are not extracted (S316/NO).

When the dynamic format is extracted (S316/YES, S328/YES), the setting unit 252 sets the extracted dynamic format (S332). When the dynamic format is not extracted and the semi-persistent format is extracted (S328/NO), the setting unit 252 sets the semi-persistent format (S336).

Then, the communication control unit 254 controls transmission processing and reception processing of the communication unit 210 depending on the format set by the setting unit 252 (S324). For example, the communication control unit 254 inserts DMRSs into a PSCCH and a PSSCH depending on the format set by the setting unit 252. In addition, the communication control unit 254 decodes a PSCCH received by the communication unit 210 depending on the format set by the setting unit 252.

As described above, according to the present embodiment, it may be possible to cope with the Doppler effect that may be generated in V2X communication by dynamically setting a DMRS arrangement format depending on the position, traveling speed and the like of the UE 20 while restricting overhead according to DMRS arrangement.

Here, the communication control unit 254 may transmit, through a PSCCH, information that indicates a format set for PSSCH transmission, as described above. An operation of the UE 20 at the receiving side based on transmission of the information will be described below with reference to FIG. 23.

FIG. 23 is a flowchart illustrating a reception operation of the UE 20. As illustrated in FIG. 23, the communication control unit 254 decodes a PSCCH received through the communication unit 210 depending on a format set by the setting unit 252 (S404). Additionally, the communication control unit 254 acquires information indicating a format used to transmit a PSSCH from the PSCCH (S408). The setting unit 252 sets the format indicated by the information for the PSSCH and the communication control unit 254 attempts to decode the PSSCH depending on the format set by the setting unit 252 (S412).

When decoding of the PSSCH fails (S416/NO), the setting unit 252 sets a format having the second highest priority from among the formats extracted in step S312 illustrated in FIG. 22 (S420). When decoding in the format fails (S424/NO), if the formats extracted in step S312 illustrated in FIG. 22 include formats that are not set, the setting unit 252 sets a format having higher priority from among the formats that are not set (S428). On the other hand, when the formats extracted in step S312 illustrated in FIG. 22 do not include formats that are not set or when the number of decoding failures amounts to a specified number of times, the UE 20 ends the processing without successfully decoding the PSSCH.

Even in a case in which the information indicating the format used to transmit the PSSCH, acquired from the PSCCH, is erroneous in the aforementioned operation, it may be possible to improve the possibility of the UE 20 successfully decoding the PSSCH.

<<D. Second Embodiment>>

The first embodiment of the present disclosure has been described. Next, a second embodiment of the present disclosure will be described. In the second embodiment, setting of a format in the UE 20 is realized on the basis of signaling from a network. To this end, the eNB 30, for example, manages (stores) the group of arrangement candidate formats correlated with application conditions, as described with reference to FIG. 9. The second embodiment of the present disclosure will be described in detail with reference to FIG. 24.

FIG. 24 is an explanatory diagram of a configuration of the eNB 30 according to the second embodiment. As illustrated in FIG. 24, the eNB 30 includes a communication unit 310, a speed detection unit 330, a storage unit 340 and a controller 350.

(Communication Unit)

The communication unit 310 is an interface of other communication devices and performs communication of various signals with other communication devices. For example, the communication unit 310 performs communication of control signals and data signals with the UE 20. In addition, when the eNB 30 includes the function of the RSU 50, the eNB 30 may communicate with the UE 20 on sidelink (Speed Detection Unit)

The speed detection unit 330 detects the speed of the UE 20. When the eNB 30 has the function of the RSU 50 and is positioned to correspond to a road, the speed detection unit 330 may be mounted in the eNB 30. For example, the speed detection unit 330 may detect the traveling speed of the vehicle 22 (UE 20) traveling on a road through various processes such as acoustic radar and image recognition.

Here, it is assumed that a plurality of vehicles 22 travel on a road at almost the same speed level. Then, the speed detection unit 330 may detect the traveling speed of one vehicle 22 as traveling speeds of the plurality of vehicles 22 or detect an average of the traveling speeds of the plurality of vehicles 22 as the traveling speeds of the plurality of vehicles 22.

(Storage Unit)

The storage unit 340 stores a plurality of formats as a group of DMRS arrangement candidate formats. As described above with reference to FIG. 9, each format is correlated with "allocation type," "application condition," "channel type" and "frequency," for example, and stored.

(Controller)

The controller 350 controls the overall operation of the eNB 30. Particularly, the controller 350 according to the present embodiment has functions of a specifying unit 352 and a communication control unit 354.

The specifying unit 352 specifies a format to be signaled to the UE 20 from the group of arrangement candidate formats stored in the storage unit 340. For example, the specifying unit 352 may specify one or more formats correlated with satisfied application conditions. The one or more formats may include one or more of a persistent format, a semi-persistent format and a dynamic format.

In an example, the UE 20 may report position information or traveling lane information to the eNB 30 and the specifying unit 352 may specify a format in response to the reported position information or traveling lane information of the UE 20. When traveling lanes having different traveling speeds, such as a normal lane and a passing lane, are mixed, it may be possible to extract a more appropriate format by using the traveling lane information.

The communication control unit 354 controls transmission processing and reception processing of the communication unit 310. Particularly, to signal the format specified by the specifying unit 352, the communication control unit 354 according to the present embodiment controls information indicating the format (which includes "application condition," "channel type" and the like) to be transmitted from the communication unit 310.

Here, since common persistent formats are used throughout the country, the communication control unit 354 may cause the communication unit 310 to broadcast information indicating a persistent format as system information of a Uu link. The communication control unit 354 may cause the communication unit 310 to broadcast information indicating semi-persistent and dynamic formats or to multicast or unicast the information. In addition, the communication control unit 354 may cause the communication unit 310 to transmit the information indicating the semi-persistent and dynamic formats to the RSU 50 such that the RSU 50 transmits the information indicating the semi-persistent and dynamic formats to the UE 20 positioned within a limited range.

When the eNB 30 has the function of the RSU 50, the communication control unit 354 may control transmission using a format depending on the traveling speed of the UE 20, detected by the speed detection unit 330, such that communication with the UE 20 is performed using the same format as the UE 20. Since the format used by the eNB 30 is expected to be the same as the format used by the UE 20 according to the aforementioned configuration, it may be possible to improve the possibility of the UE 20 successfully decoding a PSCCH and a PSSCH transmitted by the eNB 30.

The UE 20, which has received one or more formats through the aforementioned function of the eNB 30, may set one format from among the received one or more formats, for example, through the method based on priority, described with reference to FIG. 22.

The functions of the aforementioned speed detection unit 330, storage unit 340 and controller 350 may be applied to the RSU 50 that does not have the function of the eNB 30.

In addition, the first embodiment and the second embodiment may be combined. For example, persistent formats may be previously stored in the UE 20 and only semi-persistent and dynamic formats may be signaled by the eNB 30 to the UE 20.

<E. Operations Examples>

The first and second embodiments of the present disclosure have been described. Next, detailed operation examples according to embodiments of the present disclosure will be described. In the following, an example in which persistent formats and semi-persistent formats are signaled by the eNB 30 will be described. In addition, the following description is based on an arrangement candidate format group having application conditions and formats different from the arrangement candidate format group shown in FIG. 9. Furthermore, four scenarios shown in Table 2 will be described.

TABLE 2

| Scenario | Frequency band | Country | Area | Communication type | Speed |
| --- | --- | --- | --- | --- | --- |
| 1 | 6 GHz | USA | Freeway | V2V | 140 km/h |
| 2 | 6 GHz | USA | Freeway | V2V | 10 km/h |
| 3 | 6 GHz | Japan | Urban | V2I | 70 km/h |
| 4 | 700 MHz | USA | Freeway | V2V | 140 km/h |

(First Scenario)

First of all, formats set when the UE 20 traveling at 140 km/h performs V2V communication on a freeway in the United States using a frequency of 6 GHz are described as a first scenario.

Since the speed limits in the United States and the aforementioned frequency are relatively high, the eNB 30 first signals format 3 that may tolerate high-speed movement to the UE 20 as a persistent format of a PSBCH and both a PSCCH and a PSSCH.

In addition, the eNB 30 signals format 3 to the UE 20 as a semi-persistent format of both the PSCCH and the PSSCH on the basis of the traveling position of the UE 20, that is, information indicating the freeway, reported from the UE 20.

The UE 20 extracts format 3 that may tolerate high speed movement as a dynamic format of both the PSCCH and the PSSCH on the basis of the fact that the traveling speed is 140 km/h.

In the first scenario, both the format signaled from the eNB 30 and the format extracted by the UE 20 are format 3. Accordingly, the UE 20 transmits a PSBCH, PSCCH and PSSCH using format 3 in the first scenario. In addition, the UE 20 adds information indicating that format 3 is used for the PSSCH to the PSBCH and the PSCCH. The UE 20 decodes a transmitted PSBCH and PSCCH according to format 3. Additionally, the UE 20 decodes a received PSSCH on the basis of information indicating the format of the PSSCH, obtained according to decoding of the PSBCH and PSCCH.

(Second Scenario)

Next, formats set when the UE 20 traveling at 10 km/h performs V2V communication on a freeway in the United States using a frequency of 6 GHz are described as a second scenario. The second scenario differs from the first scenario in the traveling speed of the UE 20.

In the second scenario, with respect to persistent and semi-persistent formats, format 3 is signaled to the UE 20 as in the first scenario.

The UE 20 extracts format 3 as a dynamic format of a PSCCH and extracts format 1 as a dynamic format of a PSSCH on the basis of the fact that the traveling speed is 10 km/h.

In this case, the UE 20 uses format 3 for the PSCCH and uses format 1 for the PSSCH on the basis of the algorithm described with reference to FIG. 22. Furthermore, the UE 20 adds information indicating that format 1 is used for the PSSCH to the PSCCH.

(Third Scenario)

Next, formats set when the UE 20 traveling at 70 km/h performs V2I communication in an urban area in Japan using a frequency of 6 GHz are described as a third scenario.

Since the speed limits in Japan are assumed to be lower than in the United States, the eNB 30 signals format 2 for lower speed than format 3 to the UE 20 as a persistent format of both a PSCCH and a PSSCH. In addition, the eNB 30 signals format 2 as a semi-persistent format of both the PSCCH and PSSCH on the basis of V2I communication in the urban area. The UE 20 extracts format 2 as a dynamic format of both the PSCCH and PSSCH on the basis of the fact that the traveling speed is 70 km/h.

In this case, the UE 20 performs communication using format 2 for both the PSCCH and PSSCH on the basis of the algorithm described with reference to FIG. 22. In addition, the UE 20 adds information indicating that format 2 is used for the PSSCH to the PSCCH. Here, since it is desirable that communication for the PSBCH be performed conservatively, the UE 20 performs communication for the PSBCH using format 3.

(Fourth Scenario)

Next, formats set when the UE 20 traveling at 140 km/h performs V2V communication on a freeway in the United States using a frequency of 700 MHz are described as a fourth scenario.

700 MHz is a lower frequency than 6 GHz and is hardly affected by the Doppler effect. Accordingly, the eNB 30 signals format 1 having the lowest DMRS insertion frequency to the UE 20 as a persistent format of both the PSCCH and PSSCH.

The eNB 30 signals format 3 to the UE 20 as a semi-persistent format of both the PSCCH and PSSCH on the basis of the traveling position of the UE, that is, information indicating the freeway, reported form the UE 20.

The UE 20 extracts format 3 that may tolerate high speed movement as a dynamic format of both the PSCCH and PSSCH on the basis of the fact that the traveling speed is 140 km/h.

In the fourth scenario, the UE 20 performs communication using format 3 for both the PSCCH and PSSCH on the basis of the algorithm described with reference to FIG. 22. In addition, the UE 20 adds information indicating that format 3 is used for the PSSCH to the PSCCH.

<<F. Application Examples>>

(F-1. Application Examples Related to Base Station)

(First Application Example)

FIG. 25 is a block diagram illustrating a first example of an approximate configuration of an eNB to which the technology of the present disclosure is applicable. An eNB 800 (corresponding to the aforementioned eNB 30) includes at least one antenna 810 and a base station device 820. Each antenna 810 and the base station device 820 may be connected to each other via an RF cable.

Each antenna 810 includes one or more antenna elements (e.g., a plurality of antenna elements constituting a MIMO antenna) and is used for transmission and reception of radio signals through the base station device 820. The eNB 800 includes a plurality of antennas 810 as illustrated in FIG. 25, and the plurality of antennas 810 may correspond to a plurality of frequency bands used by the eNB 800, for example. While FIG. 25 shows an example in which the eNB 800 includes the plurality of antennas 810, the eNB 800 may include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 25. For example, the multiple BB processors 826 may be compatible with multiple frequency bands used by the eNB 800. The wireless communication interface 825 may include the multiple RF circuits 827, as illustrated in FIG. 25. For example, the multiple RF circuits 827 may be compatible with multiple antenna elements. Although FIG. 25 illustrates the example in which the wireless communication interface 825 includes the multiple BB processors 826 and the multiple RF circuits 827, the wireless communication interface 825 may also include a single BB processor 826 or a single RF circuit 827.

(Second Application Example)

FIG. 26 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 26. For example, the multiple antennas 840 may be compatible with multiple frequency bands used by the eNB 830. Although FIG. 26 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 25.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 25, except the BB processor 856 is connected to the RF circuit 864 of the RRH 860 via the connection interface 857. The wireless communication interface 855 may include the multiple BB processors 856, as illustrated in FIG. 26. For example, the multiple BB processors 856 may be compatible with multiple frequency bands used by the eNB 830. Although FIG. 26 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 26. For example, the multiple RF circuits 864 may support multiple antenna elements. Although FIG. 26 illustrates the example in which the wireless communication interface 863 includes the multiple RF circuits 864, the wireless communication interface 863 may also include a single RF circuit 864.

In the eNB 800 and eNB 830 illustrated in FIGS. 25 and 26, the function of the controller 350 described using FIG. 24 may be mounted in a controller 821 and a controller 851.

(F-2. Application Examples Related to UE)

(First Application Example)

FIG. 27 is a block diagram illustrating an example of a schematic configuration of a smartphone 900 to which the technology of the present disclosure may be applied, which is an example of UE. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 27. Although FIG. 27 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a radio local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 27. Although FIG. 27 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 27 via feeder lines, which are partially shown as dashed lines in the figure. The auxiliary controller 919 operates a minimum necessary function of the smartphone 900, for example, in a sleep mode.

In the smartphone 900 illustrated in FIG. 27, the function of the controller 250 described with reference to FIG. 8 may be mounted in the processor 901 or the auxiliary controller 919.

(Second Application Example)

FIG. 28 is a block diagram illustrating an example of a schematic configuration of a car navigation device 920 to which the technology of the present disclosure may be applied, which is an example of the UE 20. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 28. Although FIG. 28 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a radio LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 28. Although FIG. 28 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 28 via feeder lines that are partially shown as dashed lines in the figure. The battery 938 accumulates power supplied form the vehicle.

In the car navigation device 920 illustrated in FIG. 28, the controller 250 described with reference to FIG. 8 may be mounted in the processor 921.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

<<G. CONCLUSION>>

As described above, according to the present embodiment, it may be possible to cope with the Doppler effect that may be generated in V2X communication by dynamically setting a DMRS arrangement format depending on the position, traveling speed and the like of the UE 20 while restricting overhead according to DMRS arrangement.

It should be understood by those skilled in the art that various modifications, combinations, sub-combinations and alterations may occur depending on design requirements and other factors insofar as they are within the scope of the appended claims or the equivalents thereof.

For example, while the example in which the UE 20 sets any of formats included in the DMRS arrangement format group has been described, the present embodiment is not limited to this example. As another example, a DMRS insertion amount is correlated with an allocation type, an application example and the like, and the eNB 30 may arrange DMRSs through a method that does not particularly limit DMRSs corresponding to the insertion amount correlated with the allocation type, application condition and the like. In this case, the eNB 30 may signal information indicating the arrangement position of each DMRS to the UE 20 as an arrangement format.

In addition, while the example in which a DMRS insertion amount of a format having "persistent" as "allocation type" is less than DMRS insertion amounts of semi-persistent and dynamic formats, and the priority control example in which the dynamic format is preferentially selected have been described, the present embodiment is not limited to such examples. For example, a DMRS insertion amount of a format having "persistent" as "allocation type" may be greater than DMRS insertion amounts of semi-persistent and dynamic formats. Furthermore, when a plurality of formats are extracted, the UE 20 may preferentially set a format having a small DMRS insertion amount. That is, the UE 20 may restrain overhead by setting a semi-persistent or dynamic format (e.g., format 1 or format 2) corresponding to a satisfied application condition, if there is such a format, having a persistent and relatively conservative format (e.g., format 3) as a base.

At this time, it is desirable that format 2 include format 1 and format 3 include format 2. For example, it is desirable that format 1 correspond to the example illustrated in FIG. 10, format 2 correspond to the example illustrated in FIG. 12, and format 3 correspond to the example illustrated in FIG. 17. According to this configuration, a UE 20 using format 1 having a small DMRS insertion amount may communicate with any of a UE 20 using format 2 and a UE 20 using format 3 as well as a UE 20 using format 1, and thus it may be possible to secure communication.

In addition, respective steps in processing of the UE 20 and the eNB 30 may not necessarily be performed chronologically in the orders described in the flowcharts. For example, the respective steps in processing of the UE 20 and the eNB 30 may be performed in orders different from the orders described in the flowcharts or performed in parallel.

Furthermore, a computer program for executing the same function as each component of the UE 20 and the eNB 30 may be installed in hardware such as the CPU, ROM and RAM included in the UE 20 and the eNB 30. In addition, a recording medium storing the computer program may be provided.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A communication device including:

a communication control unit that controls vehicle communication depending on an arrangement format of a reference signal for channel estimation, used for the vehicle communication; and a setting unit that dynamically sets the arrangement format.

(2)

The communication device according to (1), wherein the setting unit sets any of arrangement candidate formats included in a group of arrangement candidate formats of the reference signal as the arrangement format.

(3)

The communication device according to (2), wherein the group of arrangement candidate formats includes arrangement candidate formats correlated with application conditions, and the setting unit sets an arrangement candidate format correlated with a satisfied application condition as the arrangement format.

(4)

The communication device according to (3), wherein the group of arrangement candidate formats includes a plurality of arrangement candidate formats correlated with the application conditions and having different priorities, and when a plurality of arrangement candidate formats correlated with a satisfied application condition are present, the setting unit sets an arrangement candidate format having a highest priority from among the plurality of arrangement candidate formats as the arrangement format.

(5)

The communication device according to (4), wherein the group of arrangement candidate formats includes a first arrangement candidate format, a second arrangement candidate format correlated with an application condition related to a traveling position, and a third arrangement candidate format correlated with an application condition related to a traveling speed, wherein the second arrangement candidate format has a higher priority than the first arrangement candidate format, and the third arrangement candidate format has a higher priority than the second arrangement candidate format.

(6)

The communication device according to (5), wherein each of the second arrangement candidate format and the third arrangement candidate format includes formats for resources for control communication and formats for resources for data communication, wherein the formats for resources for control communication in the second arrangement candidate format and the third arrangement candidate format are identical, and the formats for resources for data communication in the second arrangement candidate format and the third arrangement candidate format are different.

(7)

The communication device according to (6), wherein a condition that the traveling speed be a predetermined speed or lower is correlated with the third arrangement candidate format as the application condition, and a larger number of the reference signals are arranged in the formats for resources for data communication in the second arrangement candidate format than in the formats for resources for data communication in the third arrangement candidate format.

(8)

The communication device according to (6) or (7), wherein the communication control unit controls communication of information indicating a format applied to the resources for data communication in the resources for control communication.

(9)

The communication device according to (2), wherein the group of arrangement candidate formats includes a plurality of arrangement candidate formats correlated with different frequencies, and a larger number of the reference signals are arranged in an arrangement candidate format correlated with a first frequency than in an arrangement candidate format correlated with a second frequency lower than the first frequency.

(10)

The communication device according to any one of (2) to (9), further including a storage unit that stores information indicating the group of arrangement candidate formats.

(11)

The communication device according to (1), further including a reception unit that receives information indicating the arrangement format of the reference signal from another device, wherein the setting unit sets the arrangement format on the basis of the information received by the reception unit.

(12)

The communication device according to (8), wherein the setting unit sets a format indicated by information received in the resources for control communication from another communication device when the resources for data communication are received.

(13)

The communication device according to (12), wherein the setting unit sets another format on the basis of priority when reception of the resources for data communication in the format indicated by the information received in the resources for control communication from the other communication device fails.

(14)

The communication device according to (3), wherein the group of arrangement candidate formats includes a plurality of arrangement candidate formats correlated with the application conditions and having different priorities, and when a plurality of arrangement candidate formats correlated with a satisfied application condition are present, the setting unit sets an arrangement candidate format having a smaller arrangement amount of the reference signal from among the plurality of arrangement candidate formats as the arrangement format.

(15)

A base station including:

a storage unit that stores a group of arrangement candidate formats of a reference signal for channel estimation, used for vehicle communication; and a communication control unit that controls transmission of information indicating an arrangement candidate format included in the group of arrangement candidate formats.

(16)

The base station according to (15), further including a specifying unit that specifies an arrangement candidate format depending on a traveling position of a vehicle including a communication device from the group of arrangement candidate formats, wherein the communication control unit controls transmission of information indicating the arrangement candidate format specified by the specifying unit to the communication device.

(17)

The base station according to (15), further including a specifying unit that specifies an arrangement candidate format depending on a traveling speed of a vehicle including a communication device from the group of arrangement candidate formats, wherein the communication control unit performs transmission control for communication with the communication device depending on the arrangement candidate format specified by the specifying unit.

(18)
A communication method including:
controlling vehicle communication depending on an arrangement format of a reference signal for channel estimation, used for the vehicle communication; and
dynamically setting the arrangement format by a processor.

(19)
A communication method including:
storing a group of arrangement candidate formats of a reference signal for channel estimation, used for vehicle communication; and
controlling, by a processor, transmission of information indicating an arrangement candidate format included in the group of arrangement candidate formats.

(20)
An electronic device including:
circuitry configured to
control vehicle-to-X (V2X) communication based on an arrangement format of reference signals for channel estimation used for the V2X communication; and dynamically set the arrangement format for the reference signals.

(21)
The electronic device of (20), wherein the circuitry is configured to select the arrangement format from among a group of arrangement candidate formats.

(22)
The electronic device of (21), wherein the group of arrangement candidate formats includes arrangement candidate formats correlated with application conditions, and the circuitry is configured to set an arrangement candidate format correlated with a satisfied application condition as the arrangement format.

(23)
The electronic device (22), wherein the group of arrangement candidate formats includes a plurality of arrangement candidate formats correlated with the application conditions and having different priorities, and the circuitry is configured to set an arrangement candidate format having a highest priority from among the plurality of arrangement candidate formats as the arrangement format in a case that a plurality of arrangement candidate formats correlated with a satisfied application condition are present.

(24)
The electronic device of (23), wherein the group of arrangement candidate formats includes a first arrangement candidate format, a second arrangement candidate format correlated with an application condition corresponding to traveling position, and a third arrangement candidate format correlated with an application condition corresponding to traveling speed, and the second arrangement candidate format has a higher priority than the first arrangement candidate format, and the third arrangement candidate format has a higher priority than the second arrangement candidate format.

(25)
The electronic device (24), wherein each of the second arrangement candidate format and the third arrangement candidate format includes formats for resources for control communication and formats for resources for data communication, the formats for resources for control communication in the second arrangement candidate format and the third arrangement candidate format are identical, and the formats for resources for data communication in the second arrangement candidate format and the third arrangement candidate format are different.

(26)
The electronic device of (25), wherein a condition that the traveling speed be a predetermined speed or lower is correlated with the third arrangement candidate format as the application condition, and a larger number of the reference signals are arranged in the formats for resources for data communication in the second arrangement candidate format than in the formats for resources for data communication in the third arrangement candidate format.

(27)
The electronic device of (25), wherein the circuitry is configured to control communication of information indicating a format applied to the resources for data communication in the resources for control communication.

(28)
The electronic device of (21), wherein the group of arrangement candidate formats includes a plurality of arrangement candidate formats correlated with different frequencies, and a larger number of the reference signals are arranged in an arrangement candidate format correlated with a first frequency than in an arrangement candidate format correlated with a second frequency lower than the first frequency.

(29)
The electronic device of (21), further including:
a memory configured to store information indicating the group of arrangement candidate formats.

(30)
The electronic device of (20), further including:
a receiver configured to receive information indicating the arrangement format of the reference signal from another device, wherein
the circuitry is configured to set the arrangement format on the basis of the information received by the receiver.

(31)
The electronic device of (27), wherein the circuitry is configured to set a format indicated by information received in the resources for control communication from another communication device in a case that the resources for data communication are received.

(32)
The electronic device of (31), wherein the circuitry is configured to set another format on the basis of priority in a case that reception of the resources for data communication in the format indicated by the information received in the resources for control communication from the other communication device fails.

(33)
The electronic device of (22), wherein the group of arrangement candidate formats includes a plurality of arrangement candidate formats correlated with the application conditions and having different priorities, and the circuitry is configured to set an arrangement candidate format having a smaller arrangement amount of the reference signal from among a plurality of arrangement candidate formats as the arrangement format in a case that a plurality of arrangement candidate formats correlated with a satisfied application condition are present.

(34)
A network node including:
circuitry configured to
store a group of arrangement candidate formats of a reference signal for channel estimation used for vehicle-to-X (V2X) communication; and
control transmission of information indicating an arrangement candidate format included in the group of arrangement candidate formats.

(35)

The network node of (34), wherein the circuitry is configured to: specify an arrangement candidate format based on a traveling position of a vehicle including a communication device from the group of arrangement candidate formats; and control transmission of information indicating the specified arrangement candidate format to the communication device.

(36)

The network node of (34), wherein the circuitry is configured to: specify an arrangement candidate format based on a traveling speed of a vehicle including a communication device from the group of arrangement candidate formats; and perform transmission control for communication with the communication device based on the specified arrangement candidate format.

(37)

A communication method performed by an electronic device, the method including: controlling, by circuitry of the electronic device, vehicle-to-X (V2X) communication based on an arrangement format of reference signals for channel estimation used for the V2X communication; and dynamically setting, by the circuitry, the arrangement format for the reference signals.

(38)

A communication method performed by a network node, the method including: storing, by a memory, a group of arrangement candidate formats of a reference signal for channel estimation used for vehicle-to-X (V2X) communication; and controlling, by circuitry of the network node, transmission of information indicating an arrangement candidate format included in the group of arrangement candidate formats.

REFERENCE SIGNS LIST

20 UE
22 vehicle
30 eNB
210 communication unit
220 position estimation unit
230 speed acquisition unit
240 storage unit
250 controller
252 setting unit
254 communication control unit
310 communication unit
330 speed detection unit
340 storage unit
350 controller
352 specifying unit
354 communication control unit

The invention claimed is:

1. An electronic device comprising:
circuitry configured to
control vehicle-to-X (V2X) communication based on an arrangement format of reference signals for channel estimation used for the V2X communication; and
dynamically set the arrangement format for the reference signals in accordance with a priority of the arrangement format.

2. The electronic device of claim 1, wherein
the circuitry is configured to select the arrangement format from among a group of arrangement candidate formats.

3. The electronic device of claim 2, wherein
the group of arrangement candidate formats includes arrangement candidate formats correlated with application conditions, and the circuitry is configured to set an arrangement candidate format correlated with a satisfied application condition as the arrangement format.

4. The electronic device of claim 3, wherein
the group of arrangement candidate formats includes a plurality of arrangement candidate formats correlated with the application conditions and having different priorities, and
the circuitry is configured to set an arrangement candidate format having a highest priority from among the plurality of arrangement candidate formats as the arrangement format in a case that a plurality of arrangement candidate formats correlated with a satisfied application condition are present.

5. The electronic device of claim 4, wherein
the group of arrangement candidate formats includes a first arrangement candidate format, a second arrangement candidate format correlated with an application condition corresponding to traveling position, and a third arrangement candidate format correlated with an application condition corresponding to traveling speed, and
the second arrangement candidate format has a higher priority than the first arrangement candidate format, and the third arrangement candidate format has a higher priority than the second arrangement candidate format.

6. The electronic device of claim 5, wherein
each of the second arrangement candidate format and the third arrangement candidate format includes formats for resources for control communication and formats for resources for data communication, the formats for resources for control communication in the second arrangement candidate format and the third arrangement candidate format are identical, and
the formats for resources for data communication in the second arrangement candidate format and the third arrangement candidate format are different.

7. The electronic device of claim 6, wherein
a condition that the traveling speed be a predetermined speed or lower is correlated with the third arrangement candidate format as the application condition, and
a larger number of the reference signals are arranged in the formats for resources for data communication in the second arrangement candidate format than in the formats for resources for data communication in the third arrangement candidate format.

8. The electronic device of claim 6, wherein
the circuitry is configured to control communication of information indicating a format applied to the resources for data communication in the resources for control communication.

9. The electronic device of claim 2, wherein
the group of arrangement candidate formats includes a plurality of arrangement candidate formats correlated with different frequencies, and a larger number of the reference signals are arranged in an arrangement candidate format correlated with a first frequency than in an arrangement candidate format correlated with a second frequency lower than the first frequency.

10. The electronic device of claim 2, further comprising:
a memory configured to store information indicating the group of arrangement candidate formats.

11. The electronic device of claim 1, further comprising:
a receiver configured to receive information indicating the arrangement format of the reference signal from another device, wherein
the circuitry is configured to set the arrangement format on the basis of the information received by the receiver.

12. The electronic device of claim 8, wherein
the circuitry is configured to set a format indicated by information received in the resources for control communication from another communication device in a case that the resources for data communication are received.

13. The electronic device of claim 12, wherein
the circuitry is configured to set another format on the basis of priority in a case that reception of the resources for data communication in the format indicated by the information received in the resources for control communication from the other communication device fails.

14. The electronic device of claim 3, wherein
the group of arrangement candidate formats includes a plurality of arrangement candidate formats correlated with the application conditions and having different priorities, and
the circuitry is configured to set an arrangement candidate format having a smaller arrangement amount of the reference signal from among a plurality of arrangement candidate formats as the arrangement format in a case that a plurality of arrangement candidate formats correlated with a satisfied application condition are present.

15. A network node comprising:
circuitry configured to
store a group of arrangement candidate formats of a reference signal for channel estimation used for vehicle-to-X (V2X) communication;
control transmission of information indicating at least one arrangement candidate format included in the group of arrangement candidate formats; and
receive a setting of an arrangement candidate format from among said at least one arrangement candidate format in accordance with a priority of the arrangement format.

16. The network node of claim 15, wherein the circuitry is configured to:
specify said at least one arrangement candidate format based on a traveling position of a vehicle including a communication device from the group of arrangement candidate formats; and
control transmission of information indicating the specified at least one arrangement candidate format to the communication device.

17. The network node of claim 15, wherein the circuitry is configured to:
specify said at least one arrangement candidate format based on a traveling speed of a vehicle including a communication device from the group of arrangement candidate formats; and
perform transmission control for communication with the communication device based on the specified at least one arrangement candidate format.

18. A communication method performed by an electronic device, the method comprising:
controlling, by circuitry of the electronic device, vehicle-to-X (V2X) communication based on an arrangement format of reference signals for channel estimation used for the V2X communication; and
dynamically setting, by the circuitry, the arrangement format for the reference signals in accordance with a priority of the arrangement format.

19. A communication method performed by a network node, the method comprising:
storing, by a memory, a group of arrangement candidate formats of a reference signal for channel estimation used for vehicle-to-X (V2X) communication;
controlling, by circuitry of the network node, transmission of information indicating at least one arrangement candidate format included in the group of arrangement candidate formats; and
receiving a setting of an arrangement candidate format from among said at least one arrangement candidate format in accordance with a priority of the arrangement format.

* * * * *